US011727351B2

United States Patent
Cho

(10) Patent No.: US 11,727,351 B2
(45) Date of Patent: *Aug. 15, 2023

(54) SYSTEMS AND METHODS FOR AUTOMATED INFORMATION COLLECTION AND PROCESSING

(71) Applicant: Coupang Corp., Seoul (KR)

(72) Inventor: Ji Hun Cho, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,102

(22) Filed: Oct. 6, 2021

(65) Prior Publication Data

US 2022/0198377 A1    Jun. 23, 2022

Related U.S. Application Data

(63) Continuation of application No. 17/128,539, filed on Dec. 21, 2020, now Pat. No. 11,176,516.

(51) Int. Cl.
  *G06Q 10/087* (2023.01)
  *G06F 16/245* (2019.01)
  (Continued)

(52) U.S. Cl.
  CPC ......... *G06Q 10/087* (2013.01); *G06F 16/245* (2019.01); *G06F 16/9554* (2019.01);
  (Continued)

(58) Field of Classification Search
  CPC .. G06Q 10/087; G06Q 10/0837; G06Q 10/30; G06Q 30/0641; G06Q 30/08; G06F 16/245; G06F 16/955
  See application file for complete search history.

(56) References Cited

U.S. PATENT DOCUMENTS 6,536,659 B1 * 3/2003 Hauser .................. G06Q 30/06
                                                235/383
7,376,572 B2 * 5/2008 Siegel ................ G06Q 10/0833
                                                705/1.1
(Continued)

FOREIGN PATENT DOCUMENTS

CN     104008474 A    8/2014
CN     103279871 B    1/2016
(Continued)

OTHER PUBLICATIONS

Ho, Thi Hien Dieu, et al. "Improving the reliability of warehouse operations in the 3PL Industry: An Australian 3PL case study." 2018 International Conference on Production and Operations Management Society (POMS). IEEE, 2018. (Year: 2018).*
(Continued)

*Primary Examiner* — Asfand M Sheikh
(74) *Attorney, Agent, or Firm* — Finnegan, Henderson, Farabow, Garrett & Dunner LLP

(57) ABSTRACT

A computer-implemented database system for processing a returned item may include a memory storing instructions and at least one processor configured to execute the instructions to perform a process. The process may include receiving information relating to a returned item and selecting a first terminal among a first group of terminals. The process may also include receiving, via a first user interface, a first response to one or more first queries. The process may further include determining, based on the first response, a first condition category of the returned item. The process may further include transmitting the information relating to the returned item to the second terminal. The process may also include causing a second display associated with the second terminal to display in a second user interface one or more second queries.

20 Claims, 21 Drawing Sheets

(51) Int. Cl.
  *G06Q 30/08* (2012.01)
  *G06Q 10/0837* (2023.01)
  *G06F 16/955* (2019.01)
  *G06Q 30/0601* (2023.01)
  *G06Q 10/30* (2023.01)

(52) U.S. Cl.
  CPC ......... *G06Q 10/0837* (2013.01); *G06Q 10/30* (2013.01); *G06Q 30/0641* (2013.01); *G06Q 30/08* (2013.01)

(56) References Cited

U.S. PATENT DOCUMENTS

| | | | | |
|---|---|---|---|---|
| 7,455,226 | B1* | 11/2008 | Hammond | G06Q 20/202 705/28 |
| 7,617,133 | B1* | 11/2009 | Antony | G06Q 30/0631 705/28 |
| 7,930,223 | B2* | 4/2011 | Wang | G06Q 10/08 705/308 |
| 8,108,269 | B2* | 1/2012 | Wechsel | G06Q 10/087 705/28 |
| 8,156,007 | B1* | 4/2012 | Anthony | G06Q 99/00 705/26.1 |
| 8,311,895 | B1* | 11/2012 | Murugan | G06Q 10/0837 705/26.1 |
| 9,697,548 | B1 | 7/2017 | Jaff et al. | |
| 10,579,957 | B1* | 3/2020 | McCarthy | G06Q 10/087 |
| 10,963,885 | B2* | 3/2021 | Yerradoddi | G06Q 20/405 |
| 2003/0046180 | A1* | 3/2003 | Chiu | G06Q 10/0875 705/28 |
| 2003/0110088 | A1* | 6/2003 | Starmer | G06Q 30/02 705/26.8 |
| 2004/0128265 | A1* | 7/2004 | Holtz | G07F 17/0042 705/402 |
| 2005/0216368 | A1* | 9/2005 | Wechsel | G06Q 30/00 705/28 |
| 2006/0149577 | A1* | 7/2006 | Stashluk | G06Q 30/016 705/13 |
| 2006/0277110 | A1* | 12/2006 | Witter | G06Q 30/0601 705/26.1 |
| 2008/0091705 | A1* | 4/2008 | McBride | G06Q 50/10 707/999.102 |
| 2009/0164305 | A1* | 6/2009 | Wang | G06Q 10/08 705/28 |
| 2009/0281929 | A1* | 11/2009 | Boitet | G06Q 10/08 705/28 |
| 2010/0235290 | A1* | 9/2010 | Junger | G06Q 40/00 705/336 |
| 2010/0295847 | A1* | 11/2010 | Titus | G06T 19/20 345/419 |
| 2011/0099122 | A1* | 4/2011 | Bright | G06Q 10/04 705/348 |
| 2013/0218784 | A1* | 8/2013 | Alonzo | G06Q 10/08 705/305 |
| 2014/0333761 | A1* | 11/2014 | Porter | G07F 7/069 348/135 |
| 2015/0235248 | A1* | 8/2015 | Parris | G06Q 10/06315 705/7.35 |
| 2017/0256051 | A1* | 9/2017 | Dwivedi | G06T 7/13 |
| 2017/0323264 | A1* | 11/2017 | Subramanian | G06Q 10/087 |
| 2018/0144301 | A1* | 5/2018 | Engel | G06Q 10/0837 |
| 2019/0213573 | A1 | 7/2019 | Zelten et al. | |
| 2019/0287055 | A1* | 9/2019 | Wicks | G06Q 10/087 |
| 2019/0370837 | A1 | 12/2019 | Shamiss et al. | |

FOREIGN PATENT DOCUMENTS

| | | |
|---|---|---|
| CN | 110245214 A | 9/2019 |
| CN | 111831799 A | 10/2020 |
| KR | 10-2015-0080956 A | 7/2015 |
| KR | 10-1612328 B1 | 4/2016 |
| KR | 10-2018-0088978 | 8/2018 |
| KR | 10-2020-0057989 A | 5/2020 |
| KR | 10-2020-0065249 | 6/2020 |
| TW | I609281 B | 12/2017 |

OTHER PUBLICATIONS

Office Action in counterpart Taiwanese Application No. 110116783 dated Jun. 28, 2022 (21 pages).
International Search Report and Written Opinion for counterpart application No. PCT/IB2021/050043 dated Sep. 15, 2021 (10 pages).
Notice of Preliminary Rejection in counterpart Korean Application No. 10-2021-7019965 dated Aug. 24, 2022 (16 pages).
Stock et al., "Managing Product Returns for Competitive Advantage", Magazine Fall, 2006 (6 pages).
Rejection Decision in counterpart Taiwanese Application No. 110116783 dated Nov. 7, 2022 (8 pages).

* cited by examiner

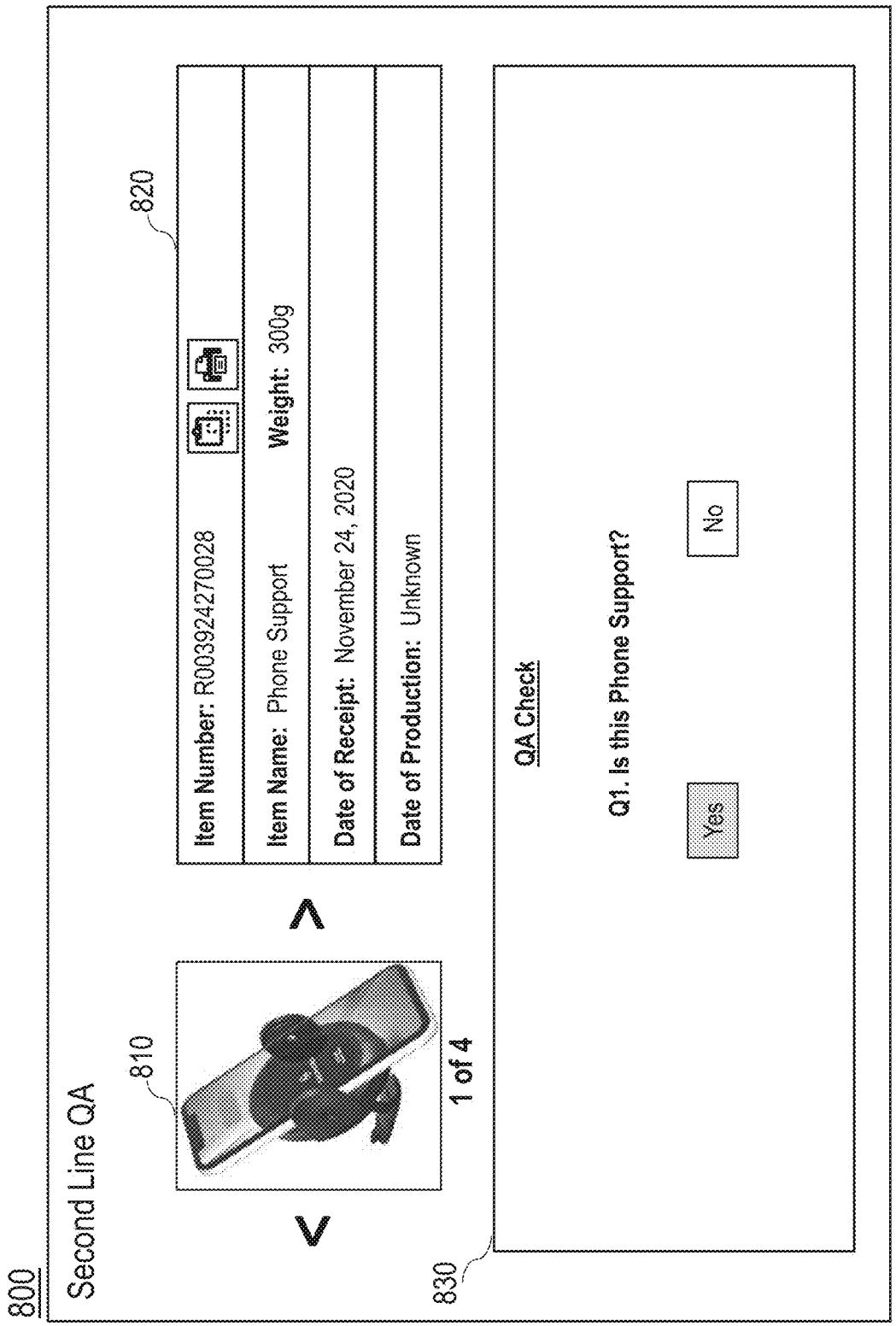

SYSTEMS AND METHODS FOR AUTOMATED INFORMATION COLLECTION AND PROCESSING

This application is a Continuation of U.S. application Ser. No. 17/128,539, filed Dec. 21, 2020 (now allowed), the contents of which is incorporated herein by reference in its entirety to provide continuity of disclosure.

TECHNICAL FIELD

The present disclosure generally relates to computerized systems and methods for collecting and processing information. In particular, embodiments of the present disclosure relate to unconventional systems and methods for automatically collecting and processing information relating to returned items.

BACKGROUND

A merchant may face a challenge when handling a great number of returned goods, which can be a tremendous burden especially during the holiday seasons. For example, to accept a return, under a typical return policy, a merchant must determine the condition of the returned item. If the item is in an acceptable condition, the customer will be accredited; otherwise, the merchant may reject the return and keep the proceeds. How to determine the condition of a returned item efficiently and effectively may be essential for the merchant. Traditionally, a merchant may employ workers to inspect returned goods and determine the condition thereof. Inspections of the goods by human beings can be time-consuming, arbitrary, and producing inconsistent outcomes in some instances. For example, workers may employ their own judgment in assessing the condition of returned goods. This approach may produce inconsistent outcomes because different works may have different standards for assessing the condition of a returned item. This can be troublesome for the merchant. For one, if a returned item is mistakenly labeled as acceptable (but in fact unacceptable), the merchant may incur an unnecessary loss. On the other hand, if a returned item is mistakenly labeled as unacceptable (but in fact acceptable) and rejected, the merchant may potentially lose a customer.

Moreover, the merchant must determine how to dispose of the returned goods (e.g., reselling them as used items, liquidating, salvaging, etc.). This aspect of handling returned goods can also be troublesome because the workers may employ similar subjective standard in their decisions.

Furthermore, while some existing systems may use computers in the return process, these types of systems may lack a centralized technical solution. For example, some existing systems may enable a worker to log, via a user interface of a terminal, an inspected return item into the inventory. The information relating to the returned item, however, may not be readily shared among terminals when a return item is routed from one terminal to another terminal for further inspection. Additionally, distributing processing tasks among terminals is also a significant technical challenge. For instance, the existing systems may lack a central management system for determining which terminal has the capacity to take a new inspection task (e.g., being free and capable of processing the inspection task). Further, in existing systems, the user interface of a terminal may present information relating to a return item in an inefficient way, which may provide no or little value in assisting the worker in inspecting the condition of the return item.

Therefore, there is a need for improved methods and systems for a streamlined, automated process for collecting and processing information relating to returned items in a centralized manner, which may process returned items more efficiently and effectively. Additionally, it is desirable to design an improved user interface to present information relating to return items in a more organized manner to help an inspector to make consistent, better decisions when processing return items.

SUMMARY

One aspect of the present disclosure is directed to a computer-implemented database system for processing a returned item. The system may include a memory storing instructions and at least one processor configured to execute the instructions to perform a process. The process may include receiving information relating to a returned item. The process may also include selecting, based on received information, a first terminal among a first group of terminals. The process may further include causing a first display associated with the first terminal to display in a first user interface an image representing the returned item and one or more first queries relating to a condition of the returned item. The first terminal may belong to a first group of terminals. The process may also include receiving, via the first user interface, a first response to the one or more first queries. The process may further include determining, based on the first response, a first condition category of the returned item. The process may also include selecting, based on the determined first condition category of the returned item, a second terminal among a second group of terminals. The second group of terminals may be different from the first group of terminals. The process may further include transmitting the information relating to the returned item to the second terminal. The process may also include causing a second display associated with the second terminal to display in a second user interface one or more second queries. The one or more second queries may be different from the one or more first queries.

Another aspect of the present disclosure is directed to a computer-implemented method for processing a returned item. The method may include receiving information relating to a returned item. The method may also include selecting, based on received information, a first terminal among a first group of terminals. The method may further include causing a first display associated with the first terminal to display in a first user interface an image representing the returned item and one or more first queries relating to a condition of the returned item. The first terminal may belong to a first group of terminals. The method may also include receiving, via the first user interface, a first response to the one or more first queries. The method may further include determining, based on the first response, a first condition category of the returned item. The method may also include selecting, based on the determined first condition category of the returned item, a second terminal among a second group of terminals. The second group of terminals may be different from the first group of terminals. The method may further include transmitting the information relating to the returned item to the second terminal. The method may also include causing a second display associated with the second terminal to display in a second user interface one or more second queries. The one or more second queries may be different from the one or more first queries.

Yet another aspect of the present disclosure is directed to a computer-implemented database system for processing a returned item. The system may include a memory storing instructions and at least one processor configured to execute the instructions to perform a process. The process may include receiving information relating to a returned item, and selecting, based on the received information, a terminal among a group of terminals. The process may also include causing a display associated with the terminal to display in a user interface an image representing the returned item and one or more queries relating to a condition of the returned item. The process may further include receiving, via the user interface, a response to the one or more queries, and inputting the response and the information relating to the returned item into a neural network to obtain a condition of the returned item. The process may also include updating a status of a return associated with the returned item based on the determined condition.

Other systems, methods, and computer-readable media are also discussed herein.

BRIEF DESCRIPTION OF THE DRAWINGS

Figure 1C:
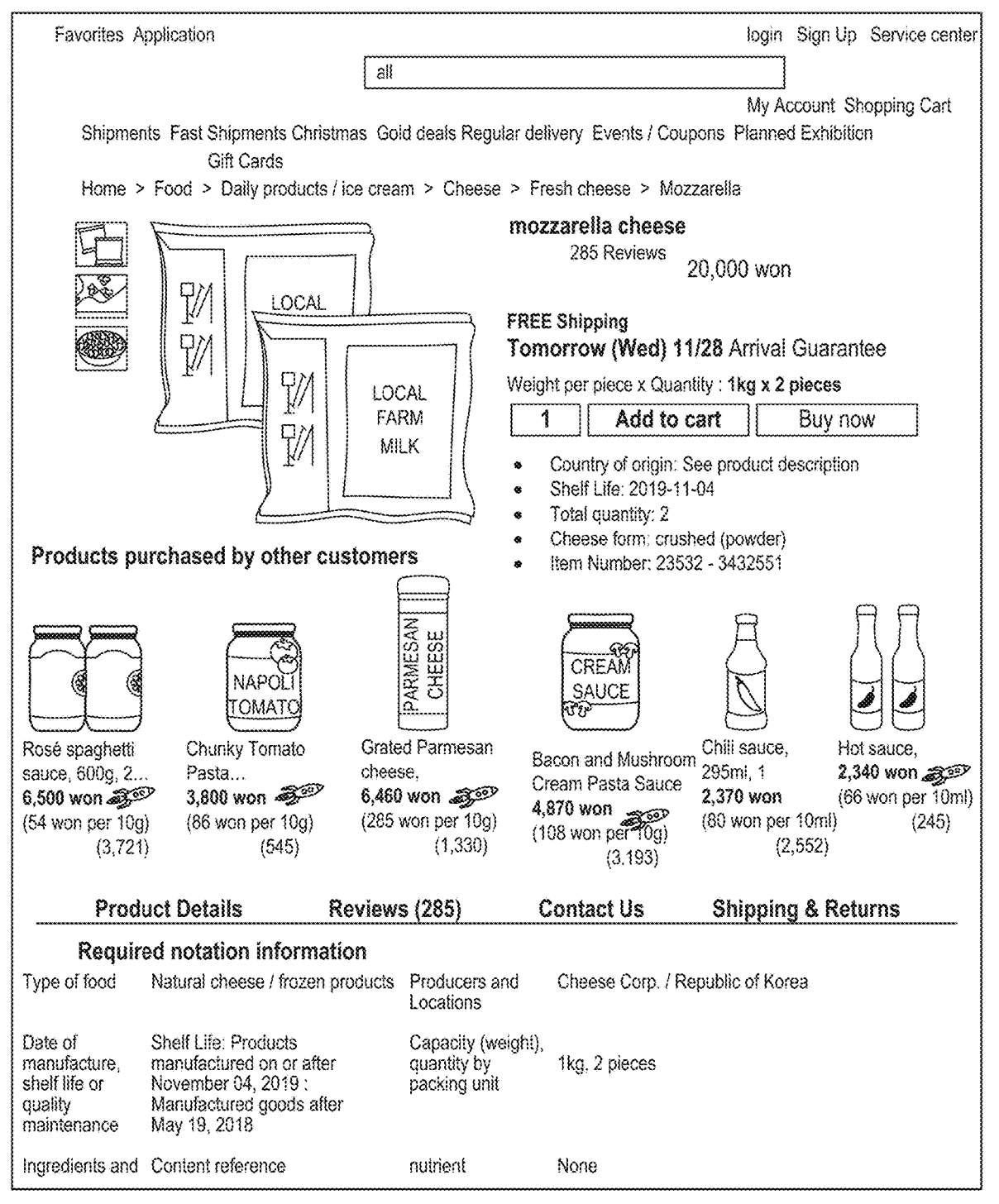

FIG. 1C depicts a sample Single Display Page (SDP) that includes a product and information about the product along with interactive user interface elements, consistent with the disclosed embodiments.

FIG. 7B illustrates a pictographic representation of an exemplary user interface, consistent with some embodiments of the present disclosure.

FIG. 7D illustrates a pictographic representation of an exemplary user interface, consistent with some embodiments of the present disclosure.

FIG. 8A illustrates a pictographic representation of an exemplary user interface, consistent with some embodiments of the present disclosure.

DETAILED DESCRIPTION

Figure 1A:
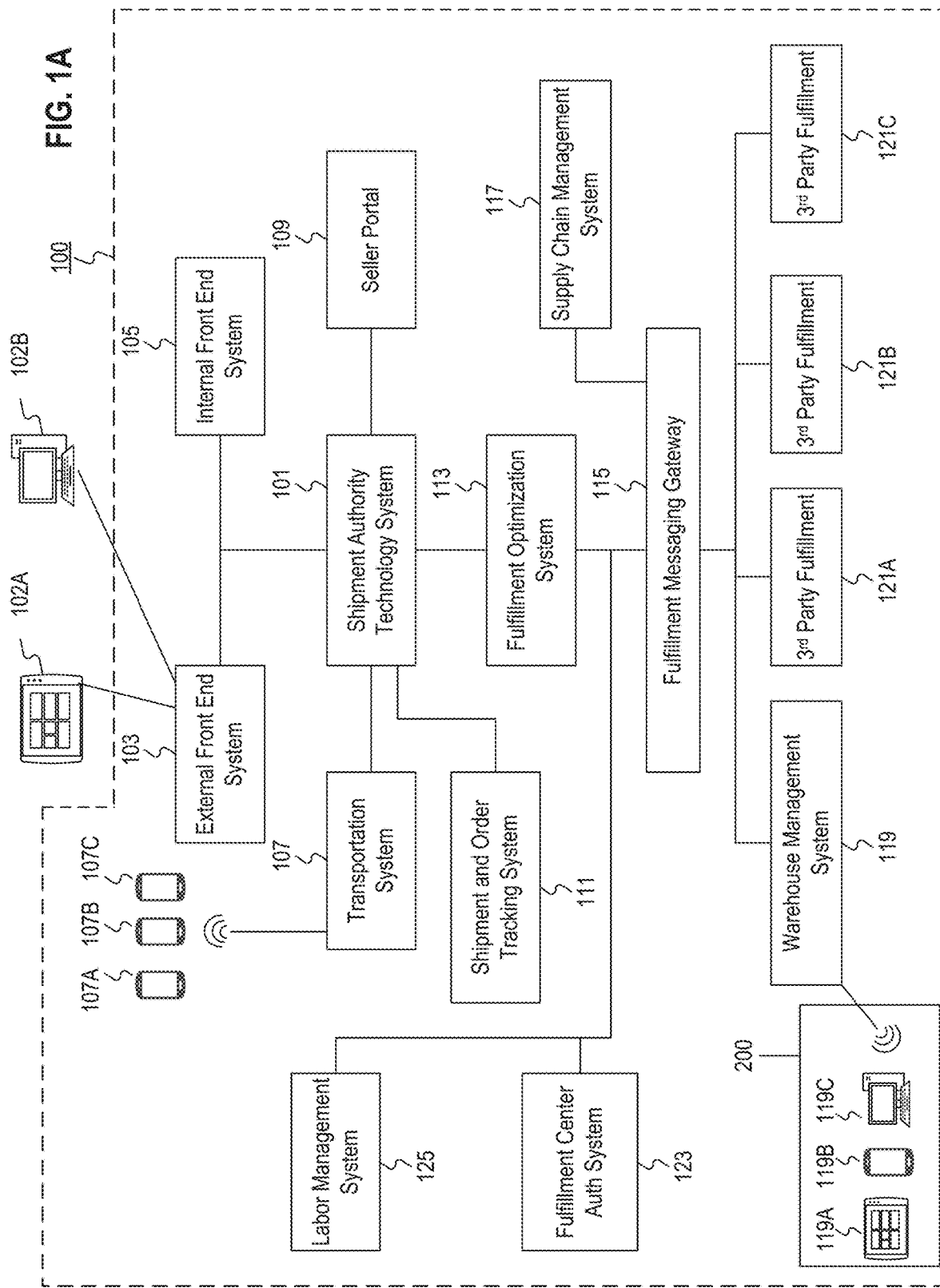
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with some embodiments of the present disclosure.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured)

operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
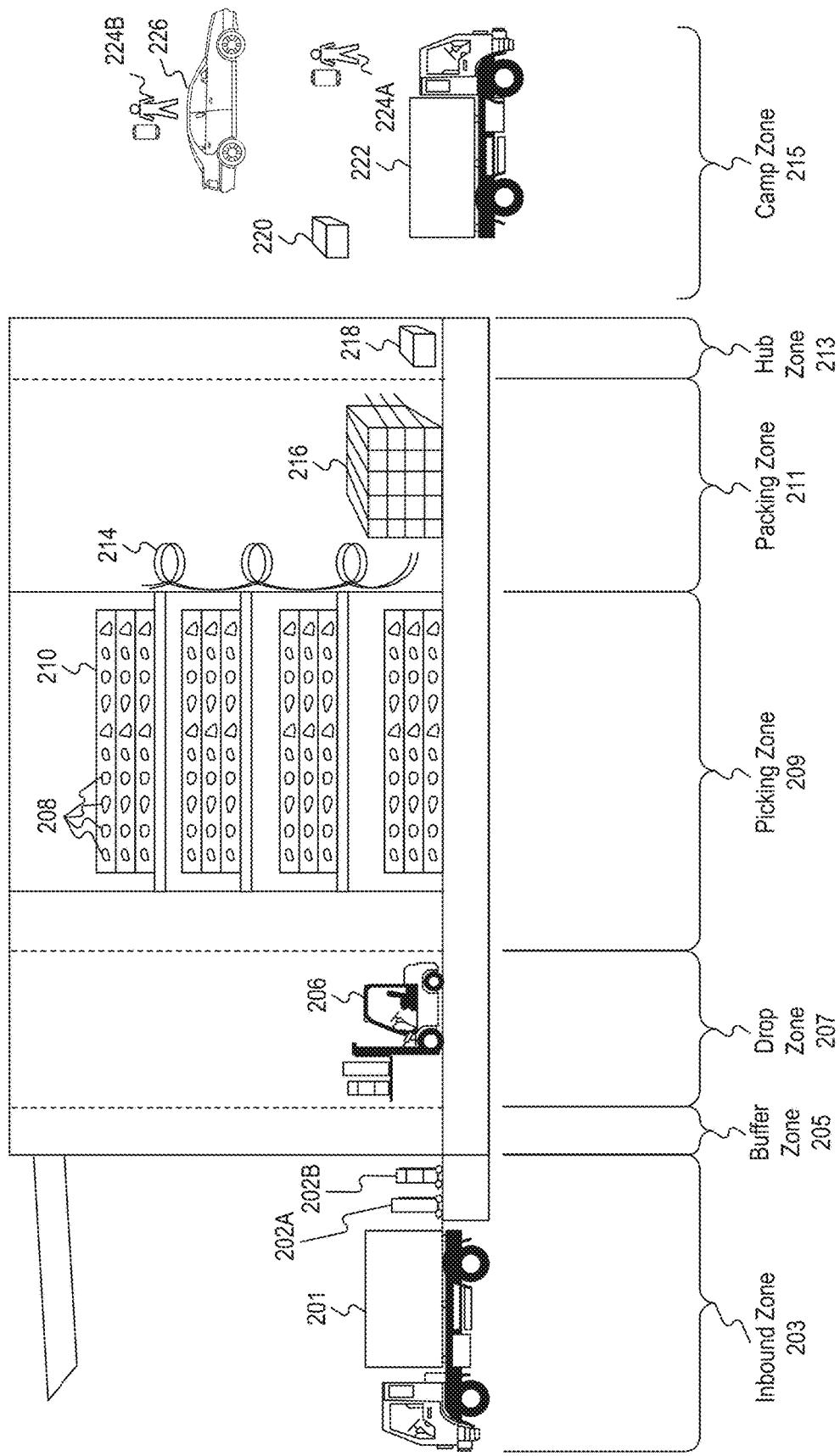
FIG. 2 is a diagrammatic illustration of an exemplary fulfillment center configured to utilize disclosed computerized systems, consistent with some embodiments of the present disclosure.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
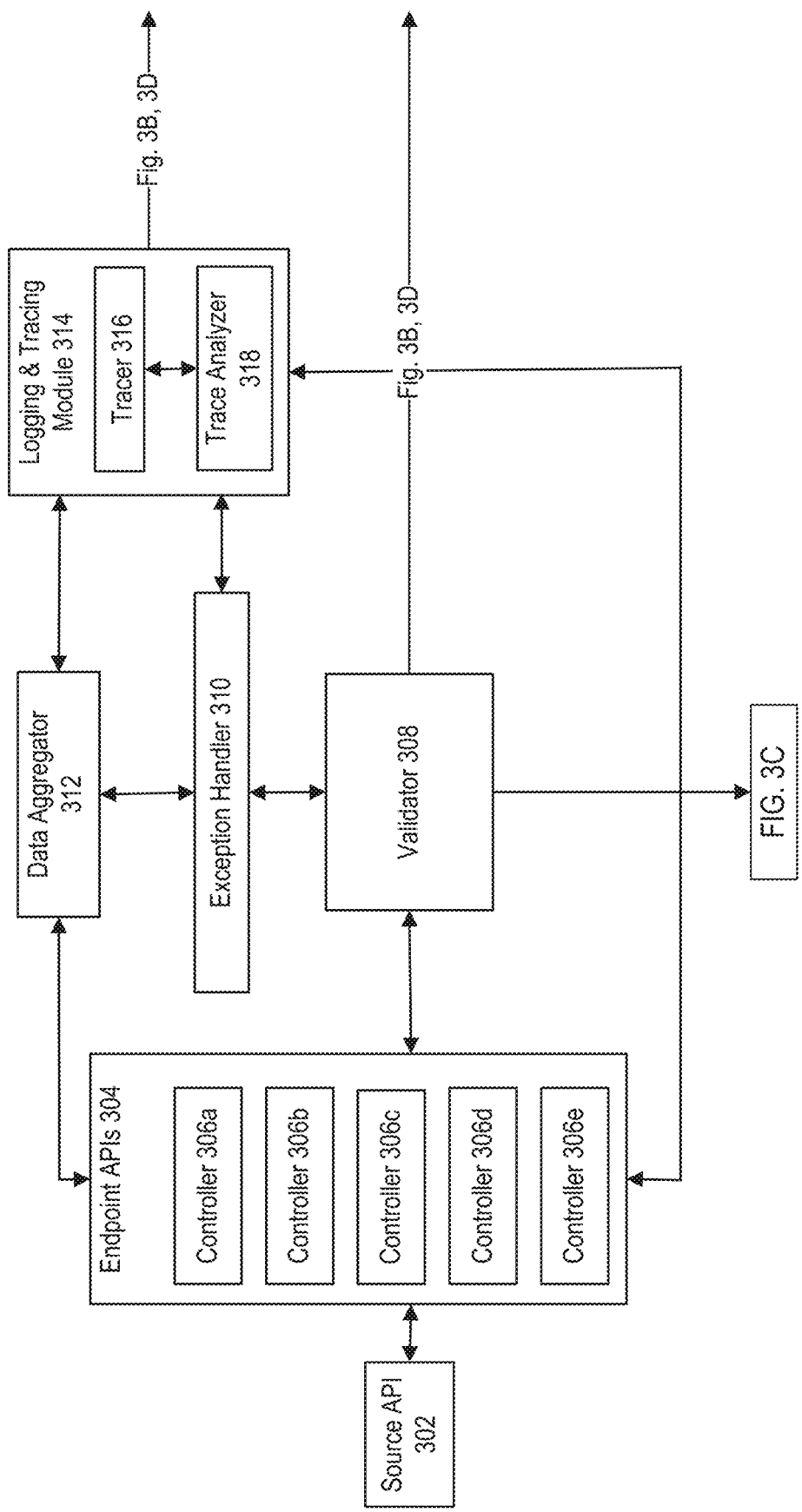
FIG. 3A illustrates an exemplary pictographic representation of an intake sub-system 300, consistent with some embodiments of the present disclosure.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, IP address, MAC address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG. 3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

Figure 3B:
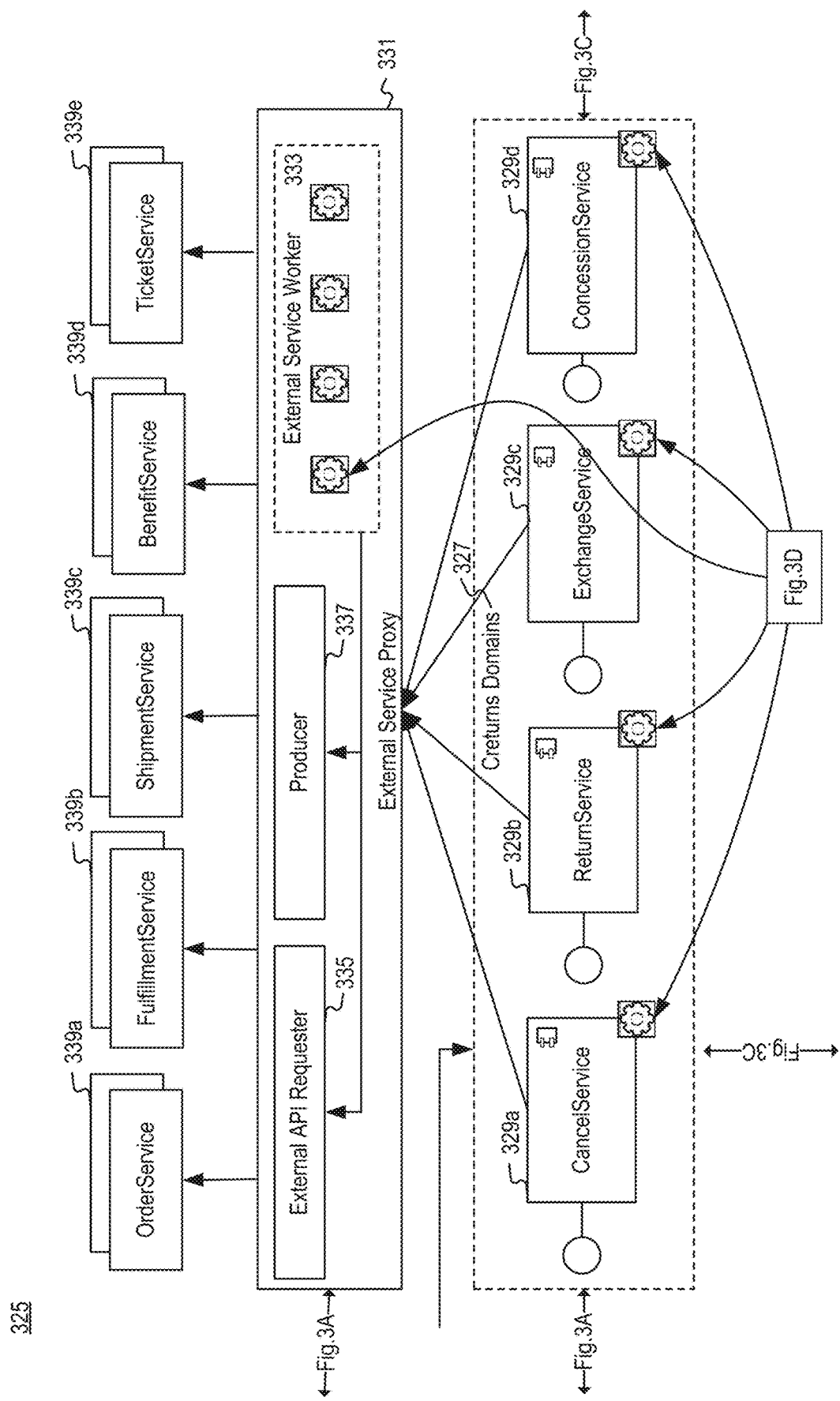
FIG. 3B illustrates an exemplary pictographic representation of an output sub-system 325, consistent with some embodiments of the present disclosure.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339*a-e*. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
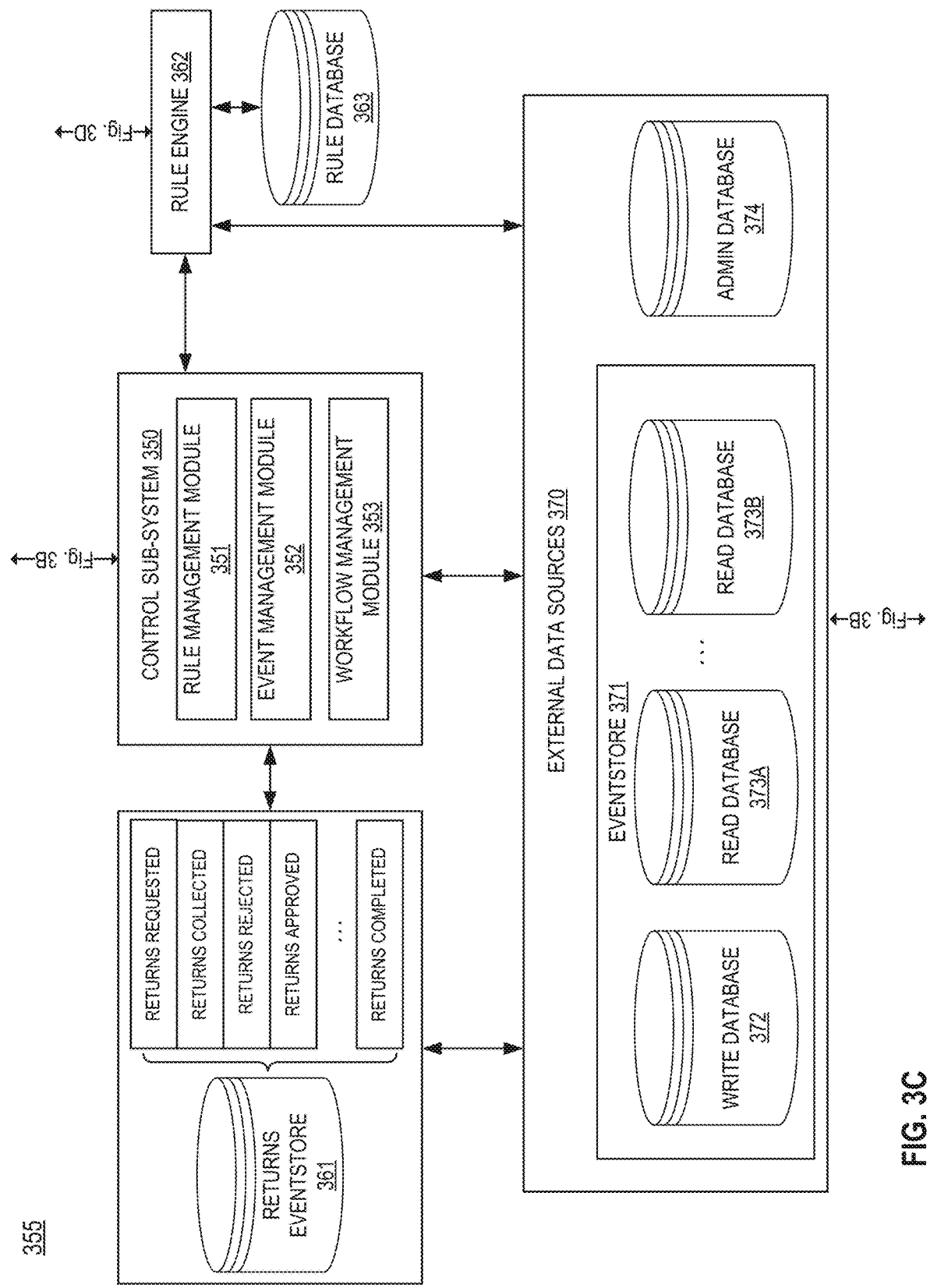
FIG. 3C illustrates a pictographic representation of an exemplary control sub-system, an exemplary returns event store, an exemplary rule engine, and exemplary external data sources, consistent with some embodiments of the present disclosure.
Figure 3D:
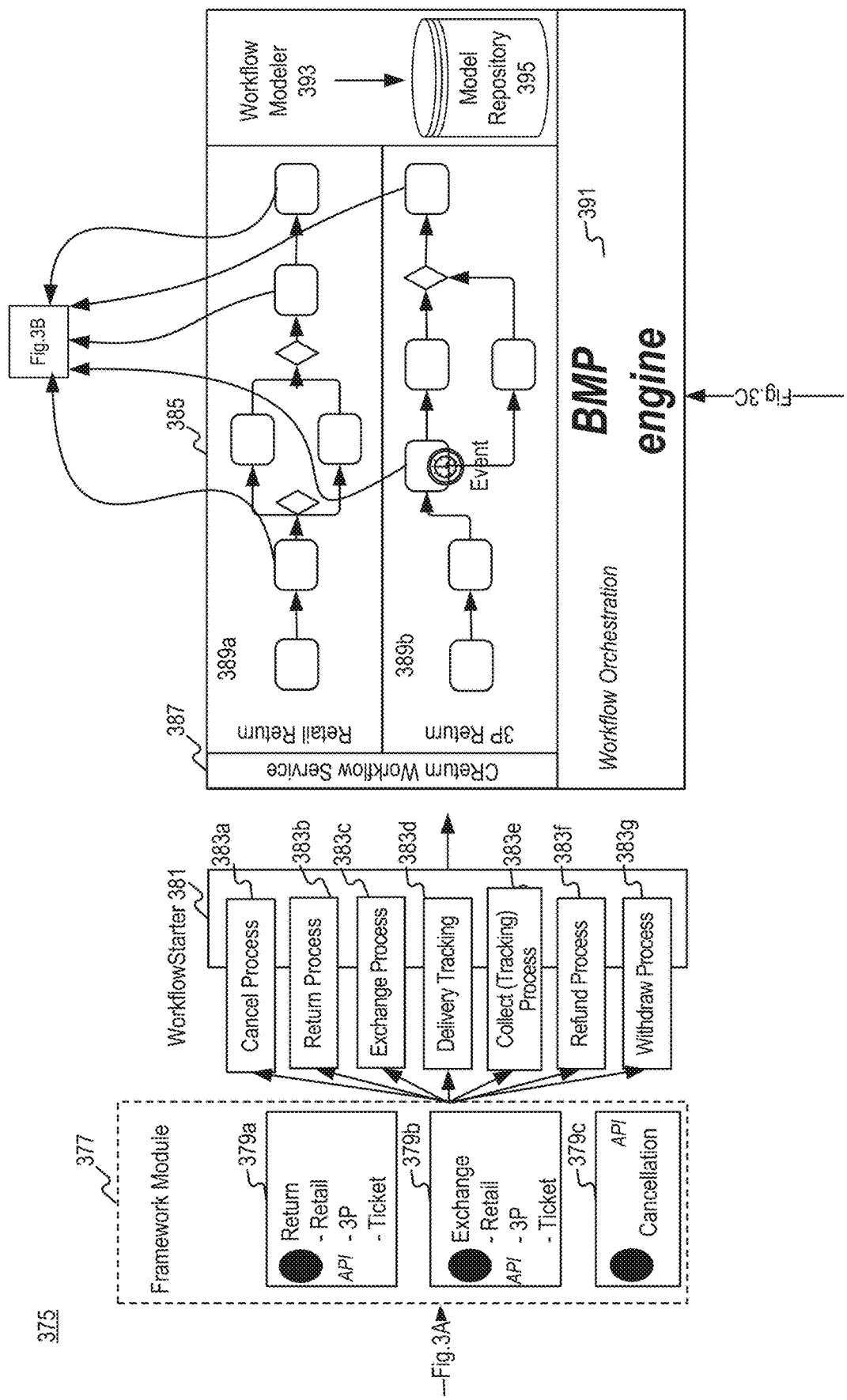
FIG. 3D illustrates an exemplary pictographic representation of a workflow sub-system 375, consistent with some embodiments of the present disclosure.

Output sub-system 325 may include a number of Creturns Domains module 327, which may be communicably coupled to workflow sub-system 375 in FIG. 3D. In some embodiments, Creturns Domains module 327 may comprise a variety of services 329*a-d*. Examples of services as illustrated on FIG. 3B may include CancelService 329*a*, ReturnService 329*b*, ExchangeService 329*c*, and/or ConcessionsService 329*d*. Each of the services 329*a-d* may be responsible for processing output from the respective workflow tasks in workflow sub-system 375 in FIG. 3D. For example, cancel process workflow 383*a* in FIG. 3D may pass an output to CancelService 329*a*, while return process workflow 383*b* in FIG. 3D may pass an output to ReturnService 329*b*. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339*a*-339*e*. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339*a*-339*e*. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn WorkflowStarter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339a-e is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339a-e. Information passed to logging & tracing module 314 is logged and processed as described earlier in in section with reference to FIG. 3A. External services 339a-e initiate actions based on the requests. Examples of services as illustrated on FIG. 3B may include OrderService 339a, FulfillmentService 339b, ShipmentService 329c, BenefitService 339d and/or TicketService 339e. Each of the services 329a-d may be responsible for initiation of specific actions. For example, in the event, workflow sub-system 375 in FIG. 3D passes an output for ExchangeService 329c processing, it may initiate a number of external services. Exchange of an item may involve an output to OrderService 339a to order (order instruction may include instruction to buy an item from a supplier, inform a picker to prepare the item, purchase the item online, go to a 3$^{rd}$ party store and pick it up, or other instructions directed to acquiring an item) a new item, output to ShipmentService 339c to generate a return shipping label, and/or an output to FulfillmentService 339b to process returned item. Architecture of output sub-system 325 may be modified to add additional external services as needed.

FIG. 3C illustrates a pictographic representation 355 of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by consumers (e.g., rules for approving and rejecting a return by a consumer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by consumers. For example, rule management module 351 may be configured to create and/or modify a rule for declining a return request by a consumer. By way of example, rule management module 351 may be configured to create and/or modify a rule for declining a return request by a consumer based on various parameters, including, for example, the data relating to the consumer's previous return(s), the monetary amount involved in the return request, the type of the goods to be returned, etc. For example, rule management module 351 may create a rule for declining a return request by a consumer if the consumer returned an empty (or partially empty) box for a return within a predetermined number of days in the past (e.g., 180 days), which may indicate the consumer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a consumer or the system and store the events into returns eventstore 361. By way of example, a consumer may initiate a return of an order via a user device associated with the consumer. Event management module 352 may create an event of receiving the return request and store the event in returns eventstore 361. In some embodiments, an event may include information relating to the return, the consumer, and the order associated with the return. For example, event management module 352 may create a first event for a return requested by a consumer, which may include the information of the return request, the time stamp of receiving the return request, the information relating to the consumer, or the like, or a combination thereof. Event management module 352 may create a second event when one or more items subject to the return are received from the consumer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™ Returns eventstore 361 may include NoSQL databases such as HBase, MongoDB™ or Cassandra™. Alternatively, database 320 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage CancelService 329a, ReturnService 329b, ExchangeService 329c, and/or ConcessionsService 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, CancelService 329a, ReturnService 329b, ExchangeService 329c, and/or ConcessionsService 329d. Creturns Domains module 327 may obtain one or more services from external data sources 370.

As another example, external data sources 370 may include an eventstore 371 configured to store data relating to events (e.g., return events). In some embodiments, eventstore 371 may include a write database 372 configured to write data in response to write commands. Eventstore may also include one or more read databases 373 (e.g., read database 373A, read database 373B, etc.) configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™ Eventstore 371 and/or admin database 374 may include NoSQL databases such as HBase, MongoDB™ or Cassandra™. Alternatively, database 320 may include relational databases such as Oracle, MySQL and Microsoft SQL Server. In some embodiments, eventstore 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3D may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a WorkflowStarter 381, which may be communicatively coupled to framework module 377. WorkflowStarter 381 may include a list of processes 383a-g, which may initiate workflows based on the input received from the framework module 377. Examples of processes as illustrated in FIG. 3D may include cancel process 383a (containing instructions for starting a workflow initiated by the cancellation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Workflow sub-system 375 may also include a workflow modeler 393 and a model repository 395. Workflow modeler 393 may create or modify workflows based on user input. Examples of workflow are shown further on to FIG. 5-23. Workflow modeler 393 may also verify if the flow of the tasks is properly defined within the workflow by communicating with Creturn Domains 327 and BPM engine 391 to capture any errors that may occur while one of Creturn Domains modules 329a-d are executing a workflow. Selection on which module is engaged may be based on the configuration of BPM engine 391. During execution/runtime, workflow modeler 393 communicates with BPM engine 391 to determine whether Creturn Domains 327 that are used in executing each task are connected and if there are any errors. Additionally, Workflow Starter 381 may receive a copy of an error message and an input value using the BPM engine 391 and pass it to the user. After workflow is verified it may be stored in model repository 395 for future access by workflow sub-system 375, e.g. for execution or additional modifications consistent with the disclosure.

Furthermore, each of the programing modules 379a-c of framework module 377 may initiate a plurality of processes 383a-g. For example, cancellation module 379c may initiate delivery tracking process 383d to determine if the item that is being canceled was deliver or is still in possession of the delivery personnel. Same cancellation module 379c may also initiate refund process 383f for issuing a refund to the consumer.

Various combinations may be programed and may be specifically configured for use by a consumer, a delivery-person, an administrator, and/or a seller. WorkflowStarter 381 may be implemented on a computing device having a processor, memory component, and/or communications component. In some embodiments, WorkflowStarter 381 and/or components of WorkflowStarter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to WorkflowStarter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389a-b which may control workflows based on the input received from the WorkflowStarter 381. Examples of processes as illustrated in FIG. 3D may include retail return sub-module 389a, which allows for design and/or control of the workflows for the return of retail items and third party return sub-module 389b, which allows for design and/or control of the workflows for the return of third party items. Architecture of Creturn workflow service module 387 be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
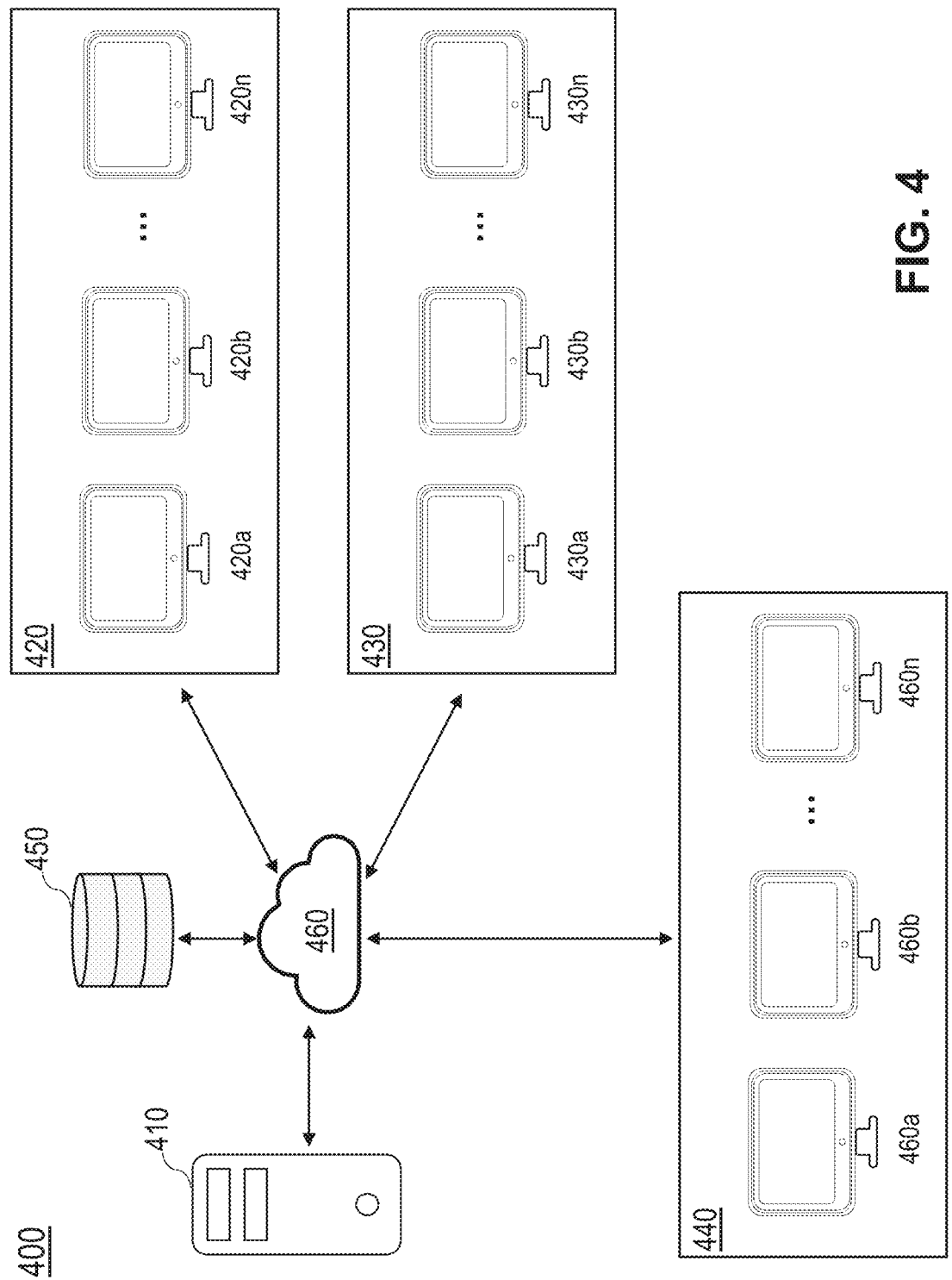
FIG. 4 illustrates a pictographic representation of an exemplary system for processing a returned item, consistent with some embodiments of the present disclosure.

FIG. 4 illustrates a pictographic representation of an exemplary system 400 for processing a returned item, consistent with some embodiments of the present disclosure. As illustrated in FIG. 4, system 400 may include one or more servers 110, a first group of terminals 420 (e.g., first terminal 420a, first terminal 420b, . . . , first terminal 420n), a second group of terminals 430 (e.g., second terminal 430a, second terminal 430b, . . . , second terminal 430n), a third group of terminals 440 (e.g., third terminal 440a, third terminal 440b, . . . , third terminal 440n), one or more databases 450, and a network 460.

Server 410 may be configured to receive information relating to a returned item and select a first terminal (e.g., first terminal 420a) of the first group of terminals 420 based on the received information relating to the returned item. Server 410 may also cause a first display associated with the first terminal to display in a first user interface at least a portion of the information relating to the returned item. For example, the first user interface may include an image representing the returned item. The first user interface may also include one or more first queries relating to a condition of the returned item. The first user interface may further be configured to receive a first response to the one or more first queries. Server 410 (and/or first terminal 420a) may also determine a first condition category of the returned item based on the received response(s). For example, server 410 may determine that the returned item is in a new condition based on a response to a query indicating that the package of the returned item is intact. In some embodiments, server 410 may determine the first condition category based on a ruled-based model, a machine-learning model, or the like, or a combination thereof.

In some embodiments, server 410 may also update a status of a return associated with the returned item based on the determined first condition category. For example, server 410 may issue a refund to a customer associated with the returned item if, for example, it is determined that the returned item is in a new condition.

In some embodiments, server 410 (and/or first terminal 420a) may determine that the returned item needs further investigation. For example, server 410 may determine that the returned item has an undecided condition (i.e., one of the condition categories). Server 410 may also select, based on the determined first condition category of the returned item, a second terminal (e.g., second terminal 430a) among second group of terminals 430, and transmit the information relating to the returned item to the second terminal. In some embodiments, the returned item may be routed to personnel associated with second terminal 430a for further investigation by, for example, an automatic carrier. By way of example, the location of the personnel (and/or second terminal 430a) may be obtained and sent to an automatic carrier (e.g., an unmanned vehicle), which may carry the returned item and deliver the returned item to the location of the personnel (and/or second terminal 430a).

Server 410 may also cause a second display associated with the second terminal to display in a second user interface at least a portion of the information relating to the returned item. For example, the second user interface may include an image representing the returned item. The second user interface may also include one or more second queries relating to a condition of the returned item, which may be different from the one or more first queries. The second user interface may further be configured to receive a second response to the one or more second queries. Server 410

(and/or second terminal 420*a*) may also determine a second condition category of the returned item based on the received response(s). In some embodiments, server 410 may determine the second condition category based on a ruled-based model, a machine-learning model, or the like, or a combination thereof.

In some embodiments, server 410 may update a status of a return associated with the returned item based on the determined second condition category. For example, server 410 may reject the return associated with the returned item if, for example, it is determined that the returned item is in a salvage condition.

In some embodiments, server 410 may determine that the returned item may be in a condition needing repair. Server 410 may further transmit the information relating to the returned item to one of third group of terminals 440 (e.g., third terminal 440*a*). In some embodiments, the returned item may be routed to a personnel associated with third terminal 440*a* for further investigation by, for example, an automatic carrier. By way of example, the location of the personnel (and/or third terminal 440*a*) may be obtained and sent to an automatic carrier (e.g., an unmanned vehicle), which may carry the returned item and deliver the returned item to the location of the personnel (and/or third terminal 440*a*). In some embodiments, server 410 may receive an updated condition of the returned item from the third terminal after the repair. For example, server 410 may receive an updated condition of "Refurbished" that may be eligible for resale after the repair.

In some embodiments, server 410 may list the returned item on a webpage and/or an application page for sale (or liquidation) based on a determined condition category (e.g., the first condition category, the second condition category, or the repaired condition category).

While FIG. 1 illustrates one server 410, one skilled in the art would understand that system 400 may include one or more servers 410 that, individually or in combination, perform the functions of server 410 disclosed in this application. For example, server 410 may constitute a cloud server group comprising two or more servers that perform the functions disclosed herein. The term "cloud server" refers to a computer platform that provides services via a network, such as the Internet. In this example configuration, server 410 may use virtual machines that may not correspond to individual hardware. For example, computational and/or storage capabilities may be implemented by allocating appropriate portions of computation/storage power from a scalable repository, such as a data center or a distributed computing environment. In one example, server 410 may implement the methods described herein using customized hard-wired logic, one or more Application Specific Integrated Circuits (ASICs) or Field Programmable Gate Arrays (FPGAs), firmware, and/or program logic which, in combination with the computer system, cause server 410 to be a special-purpose machine.

One or more first terminals of first group of terminals 420 may be configured to receive information relating to one or more returned items from server 410 via, for example, network 460. A first terminal may display at least a portion of the information relating to the returned item in a user interface. The user interface may also include one or more queries relating to the condition of the returned item. The first terminal may also receive one or more responses to the one or more queries via the user interface. In some embodiments, the first terminal may determine a first condition category of the returned item based on the received one or more response(s) and transmit the determined first condition category to server 410. In some embodiments, first group of terminals 420 may include one or more of desktops, laptops, tablet PCs, mobile devices/PDAs, workstations, or the like, or a combination thereof.

One or more second terminals of second group of terminals 430 may be configured to receive information relating to one or more returned items from server 410 via, for example, network 460. Second group of terminals 430 may be different from first group of terminals 420. For example, first group of terminals 420 may be associated with a first group of workers (e.g., first line quality control (QA)), and second group of terminals 430 may be associated with second group of workers (e.g., the second line QA) who are more experienced than the first line QA for handling returned items. Alternatively or additionally, second group of terminals 430 may include more advanced hardware components that those of first group of terminals 420, and/or may be configured to run different or more complicated machine-learning algorithms for, e.g., determining a condition of a returned item based on one or more images of the returned item. A second terminal may display at least a portion of the information relating to the returned item in a user interface. The user interface may also include one or more queries relating to the condition of the returned item. The second terminal may also receive one or more responses to the one or more queries via the user interface. In some embodiments, the second terminal may determine a second condition category of the returned item based on the received one or more response(s), and transmit the determined second condition category to server 410. In some embodiments, second group of terminals 430 may include one or more of desktops, laptops, tablet PCs, mobile devices/PDAs, workstations, or the like, or a combination thereof.

One or more third terminals of third group of terminals 440 may be configured to receive information relating to one or more returned items from server 410 via, for example, network 460. Third group of terminals 440 may be different from first group of terminals 420 and second group of terminals 430. For example, first group of terminals 420 and second group of terminals 430 may be associated with inspections of returned items (e.g., determining a condition of a returned item). Third group of terminals 440 may be associated with a repair center, which may handle repairs of returned items. A third terminal may display at least a portion of the information relating to the returned item in a user interface. The user interface may also include one or more queries relating to the condition of the returned item. The third terminal may also receive one or more responses to the one or more queries via the user interface. In some embodiments, the third terminal may determine a third condition category of the returned item based on the received one or more response(s) and transmit the determined second condition category to server 410. In some embodiments, third group of terminals 430 may include one or more of desktops, laptops, tablet PCs, mobile devices/PDAs, workstations, or the like, or a combination thereof.

Database 450 may be configured to store information and data for the components of system 400. For example, database 450 may store information relating to one or more returned items. Server 410, first group of terminals 420, second group of terminals 430, and third group of terminals 440 may retrieve the information relating to a returned item from database 450.

Network 460 may be configured to facilitate communications among the components of system 400. Network 460 may include wired and wireless communication networks, such as a local-area network (LAN), a wide-area network (WAN), a computer network, a wireless network, a telecommunications network, or the like, or a combination thereof.

Figure 5:
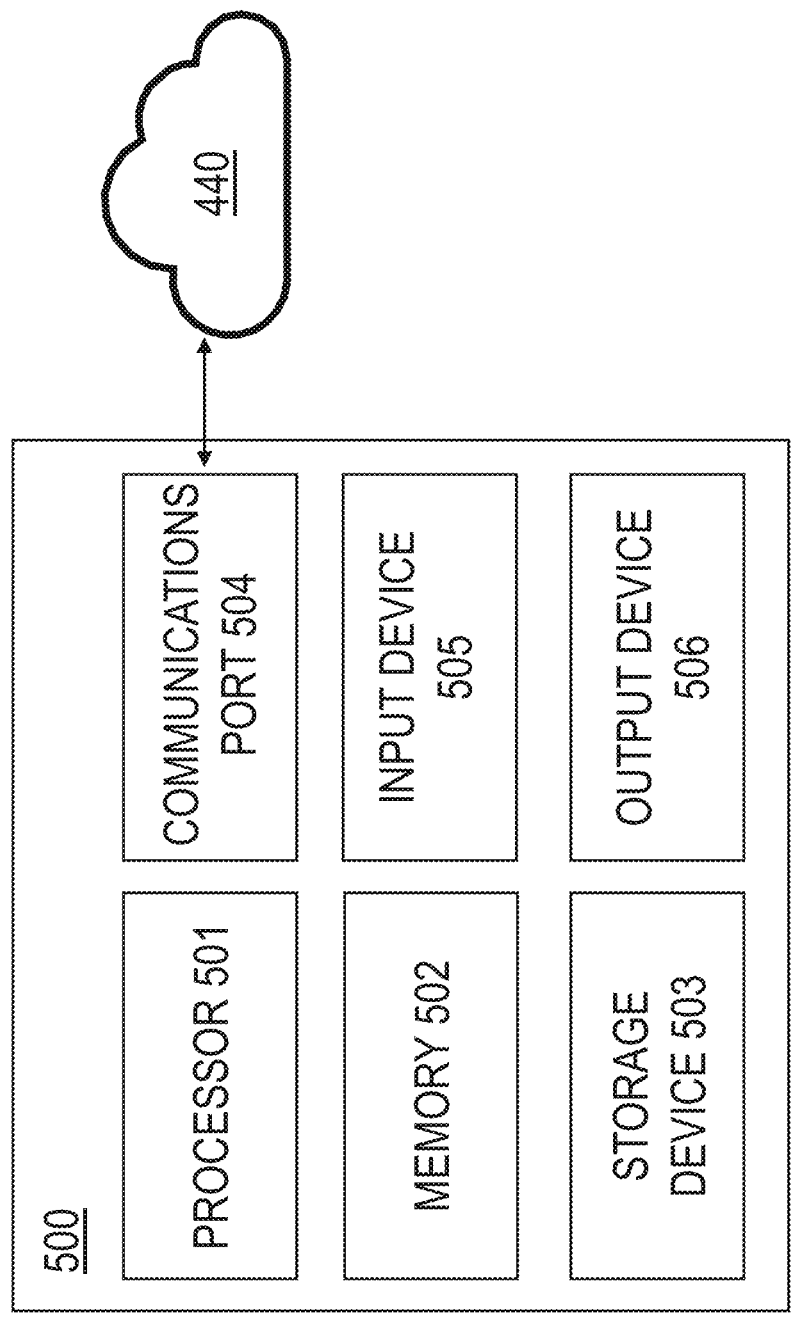
FIG. 5 illustrates a pictographic representation of an exemplary computing device, consistent with some embodiments of the present disclosure.

FIG. 5 illustrates a pictographic representation of an exemplary computing device 500, consistent with some embodiments of the present disclosure. Server 410 first group of terminals 420, second group of terminals 430, and third group of terminals 440 may be implemented based on the architecture of computing device 500. For example, server 410 may include one or more components of computing device 500 configured to perform its functions described in this disclosure; first terminal 420a (and/or other first terminals) may include one or more components of computing device 500 configured to perform its functions described in this disclosure; second terminal 430a (and/or other second terminals) may include one or more components of computing device 500 configured to perform its functions described in this disclosure; and third terminal 440a (and/or other third terminals) may include one or more components of computing device 500 configured to perform its functions described in this disclosure.

As illustrated in FIG. 5, computing device 500 may include at least one processor (e.g., processor 501), a memory 502, at least one storage device (e.g., storage device 503), a communications port 504, an input device 505, and an output device 506.

Processor 501 may be configured to perform one or more functions of server 410, first terminal 420a, second terminal 430a, and/or third terminal 440a described in this disclosure. Processor 501 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 501 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc., and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Computing device 500 may also include a memory 502 that may store instructions for various components of computing device 500. For example, memory 502 may store instructions that, when executed by processor 501, may be configured to cause processor 501 to perform one or more functions described herein. Memory 502 may include any number of random-access memories, read-only memories, flash memories, disk drives, optical storage, tape storage, removable storage, and other types of storage. In one instance, memory 502 may be separate from processor 501. In another instance, memory 502 may be integrated into processor 501. In some embodiments, memory 502 may include software for performing one or more computing tasks, as well as a trained system, such as a neural network, or a deep neural network, for example.

Storage device 503 may be configured to store various data and information for one or more components of computing device 500. For example, processor 501 may write data relating to one or more returned items to storage device 503, and read data relating to one or more returned items from storage device 503. As another example, processor 501 may retrieve from storage device 503a trained machine-learning model for determining a condition category of a returned item, which may receive input (e.g., one or more responses to one or more queries) and generate output of a condition category for a returned item. Storage device 503 may include one or more hard drives, tapes, one or more solid-state drives, any device suitable for writing and read data, or the like, or a combination thereof.

Communications port 504 may be configured to facilitate data communications between computing device 500 and one or more components of system 400 via network 460. For example, server 410 may include communications port 504 configured to transmit information relating to a returned item to first terminal 420a via network 460.

Input device 505 may be configured to receive input from the user of computing device 500, and one or more components of computing device 500 may perform one or more functions in response to the input. In some embodiments, input device 505 may include an interface displayed on a touchscreen (e.g., output device 506).

Output device 506 may be configured to output information and/or data to the user. For example, output device 506 may include a display configured to display the information relating to a returned item.

Figure 6:
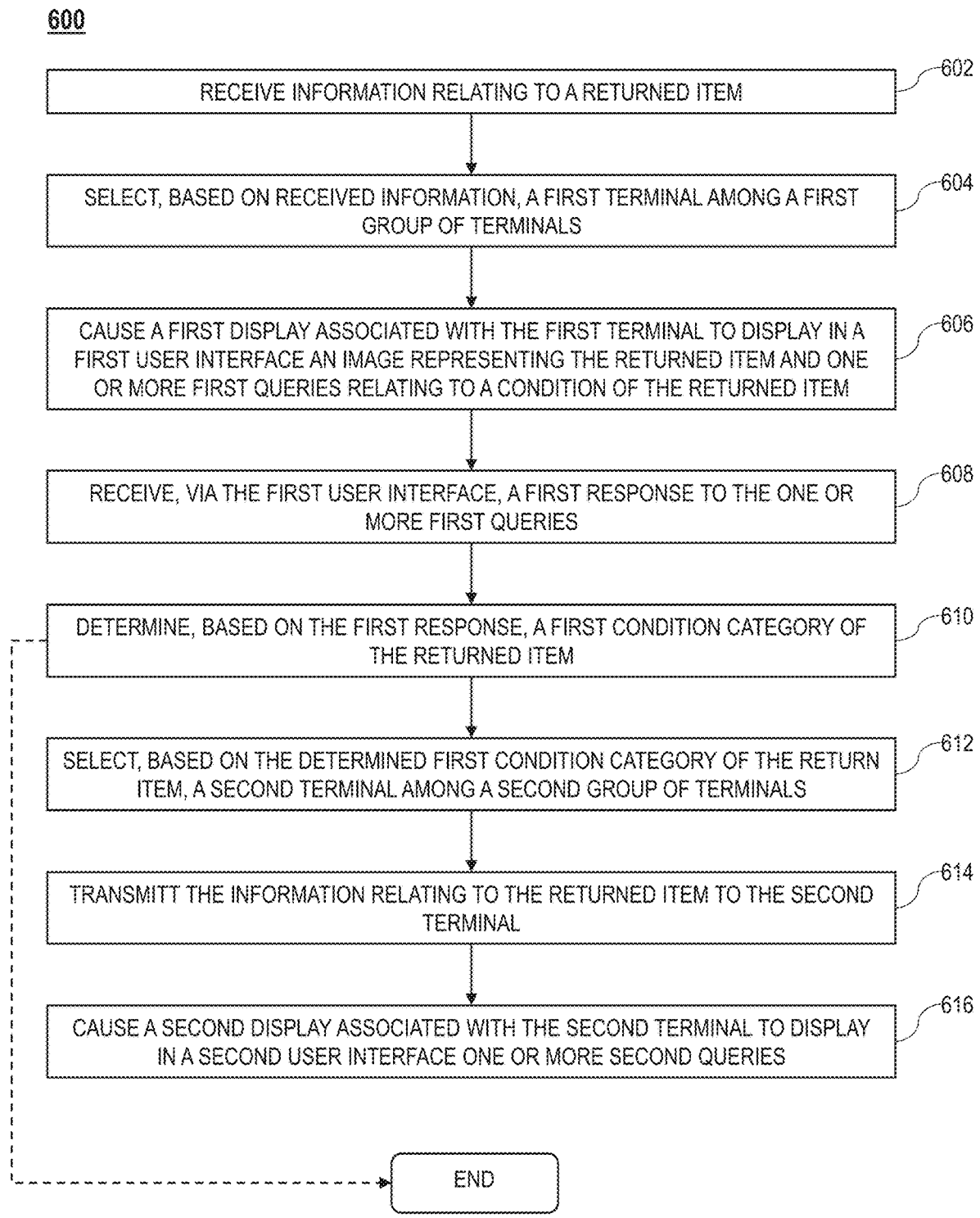
FIG. 6 illustrates a flowchart of an exemplary process for processing a returned item, consistent with some embodiments of the present disclosure.

FIG. 6 illustrates a flowchart of an exemplary process 600 for processing a returned item, consistent with some embodiments of the present disclosure. While server 410 is described herein as an exemplary component that performs the steps of process 600, one skilled in the art would understand that other component(s) of the sub-systems described in this disclosure can also perform one or more steps of process 600. For example, first terminal 420a may be configured to determine a first condition category based on one or more responses to one or more queries relating to a condition of a returned item. As another example, second terminal 430a may be configured to determine a second condition category based on one or more responses to one or more queries relating to a condition of a returned item.

At step 602, server 410 may receive information relating to a returned item. For example, server 410 may receive information relating to a returned item from returns eventstore 361, which may store a series of events relating to a return associated with the returned item. Exemplary information relating to a returned item may include the information of the item, the information of a return (or an order) associated with the item, or the like, or a combination thereof. Exemplary information of the item may include an item name, one or more item numbers (or IDs), physical properties (e.g., a size, a shape, a weight, etc.), a date of production, one or more images of the actual returned item, one or more images of an item that is the same type of the returned item or the like, or a combination thereof. Exemplary information of a return (or an order) associated with the item may include the date of the return request, the date of receiving the item, or the like, or a combination thereof. In some embodiments, server 410 may cause a sensor (e.g., a camera, a barcode scanner) to detect identity of the returned item and obtain the information relating to the returned item based on the detected identity. For example, server 410 may cause a scanner to scan an identifier or indicia on a package of the returned item or the returned item. Alternatively or additionally, server 410 may cause a camera to capture an image of the returned item, and identify the returned item based on the captured image of the returned item. Server 410 may also obtain, from a database (e.g., database 450), the information relating to a returned item stored based on the identifier. In some embodiments, server 410 may receive one or more images representing the returned item (e.g., one or more images of an item that is the same kind of the returned item) based on the identifier from database 450.

At step 604, server 410 may select, based on the received information, a first terminal among a first group of terminals. For example, first group of terminals 420 may be used for inspecting different categories of returned items. Server 410 may determine that the returned item belongs to a category of electronics based on the received information relating to the returned item. Server 410 may select a first terminal (e.g., first terminal 420*a*), which may be designated for inspecting electronics. Alternatively or additionally, server 410 may select a particular first terminal based a preliminary assessment of the condition based on the information of the package of the returned item. For example, the information relating to the returned item may include information relating to the package of the item, which may be determined based on one or more images of the package captured by a camera when the package was received. Server 410 may determine that the package is unopened based on the information relating to the package and select a particular first terminal based on the condition of the package (and/or the category of the item as described above).

Figure 7A:
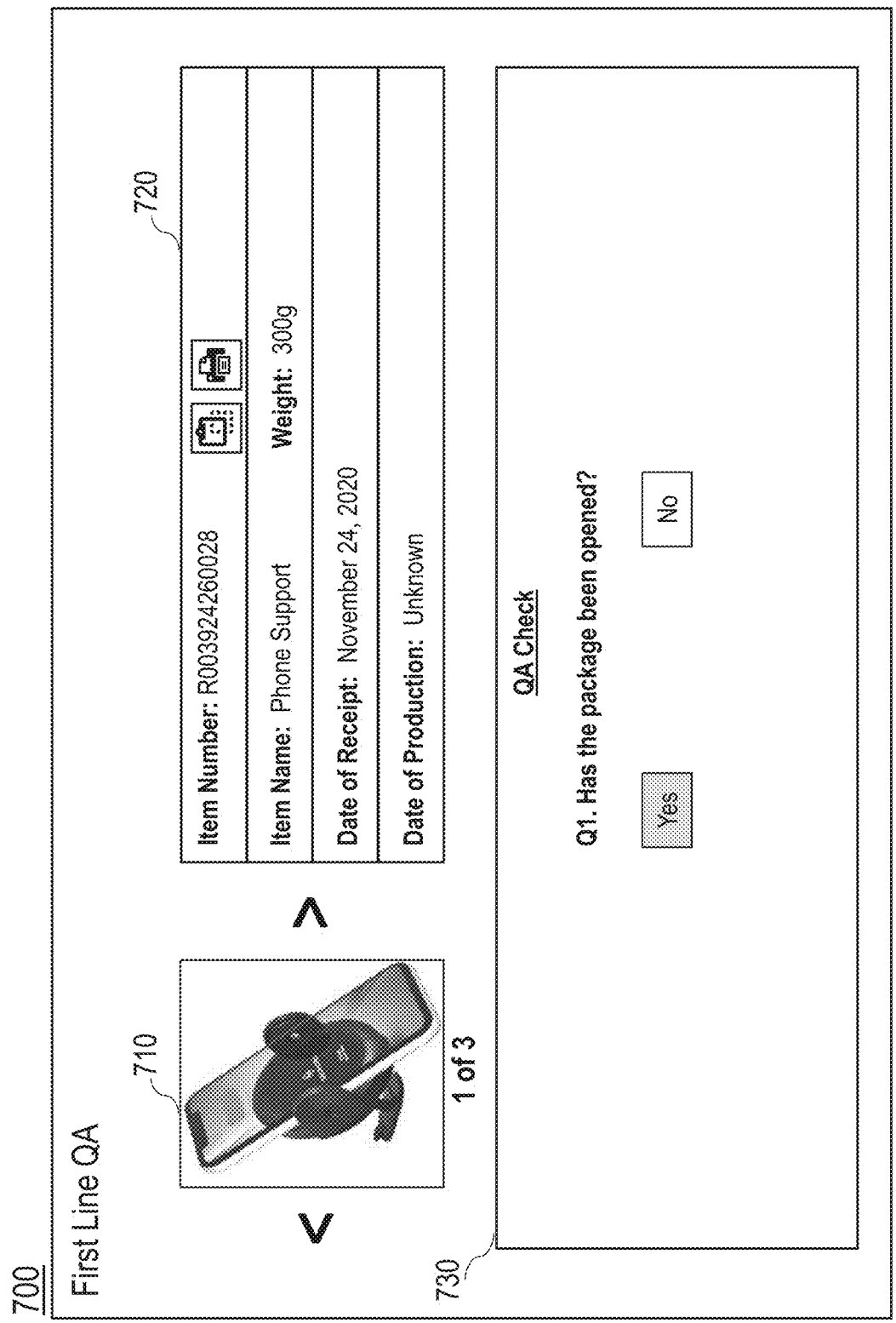
FIG. 7A illustrates a pictographic representation of an exemplary user interface, consistent with some embodiments of the present disclosure.

At step 606, server 410 and/or first terminal 420*a* may cause a first display associated with the first terminal to display in a first user interface at least a portion of the information relating to the returned item. For example, server 410 may cause a display of first terminal 420*a* to display in a user interface an image representing the returned item. In some embodiments, the user interface may also display one or more first queries relating to a condition of the returned item. By way of example, FIGS. 7A, 7B, 7C, and 7D illustrate an exemplary user interface 700 (displayed in a display of first terminal 420*a*) configured to display various information relating to the returned item. As illustrated in FIG. 7A (and FIGS. 7B, 7C, and 7D), user interface 700 may include a first area 710 configured to display one or more images of the returned item (and/or an item that is the same kind of the returned item), a second area 720 configured to display the information of the item (e.g., item name, item number, etc.), and a third area 730 configured to display one or more queries relating to the condition of the item. User interface 700 may also be configured to receive one or more responses to the one or more queries. For example, as illustrated in FIG. 7A, area 730 may display a query "Q1. Has the package been opened?", which may be relating to a condition of the package and/or a condition of the product (i.e., the item(s) within the package). Exemplary queries may include one or more of a question, an instruction for inspection, a manual, or the like, or a combination thereof. A query may include a text, an image, a video, or the like, or a combination thereof. In some embodiments, at least one query relating to the condition of the package of the returned item may include information relating to two or more exemplary package conditions. For example, user interface 700 may include two or more exemplary package conditions (e.g., one of a perfect condition, a package having minor scratches, a package having one or more dents, a package having major damage, etc.). In some embodiments, the information relating to two or more exemplary package conditions may include an exemplary image representing at least one of the two or more exemplary package conditions. First terminal 420*a* may receive a selection by the operator of first terminal 420*a* of the two or more exemplary package conditions as a response indicating, for example, a condition of the package of the returned item.

In some embodiments, server 410 may transmit one or more queries to first terminal 420*a*. Alternatively or additionally, first terminal 420*a* may obtain one or more queries from a local storage device or a remote storage device (e.g., database 450).

Figure 7B:
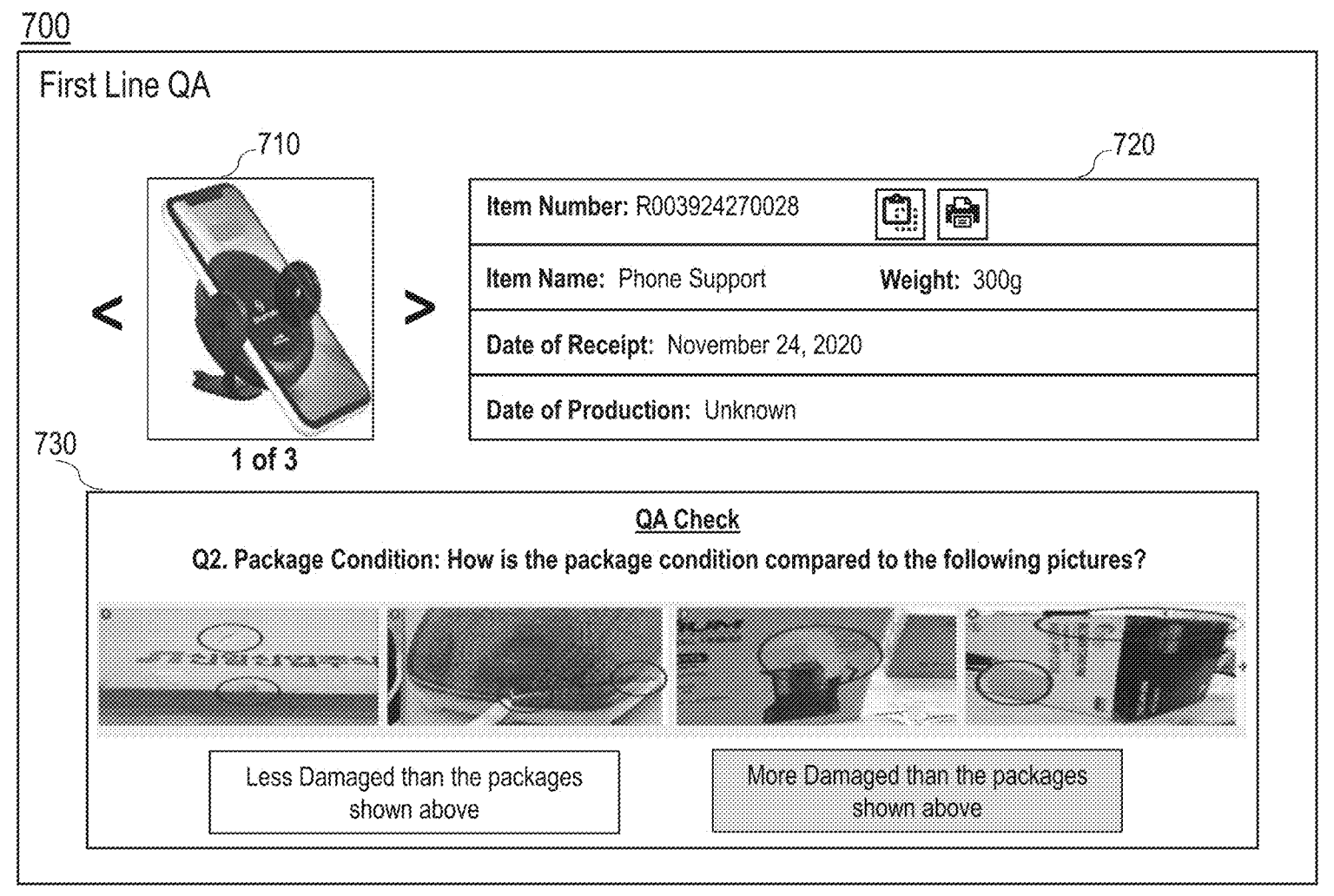

At step 608, server 410 (and/or first terminal 420*a*) may receive, via the first user interface, a first response to the one or more first queries. For example, as described above, user interface 700 may display a query "Q1. Has the package been opened?". An inspector associated with first terminal 420*a* may click the "Yes" button through an input device (e.g., input device 505). First terminal 420*a* may receive the response and determine the next query to be displayed in user interface 700. For example, as illustrated in FIG. 7B, first terminal 420*a* may display the second query "Q2. Package Condition: How is the package condition compared to the following pictures?" in response to the received answer to the first query (indicating that the package has been opened). First terminal 420*a* may also receive a response to the Q2 query via user interface 700 (e.g., a click of the button "More Damaged than the packages shown above").

Figure 7C:
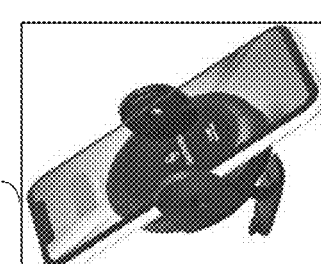
FIG. 7C illustrates a pictographic representation of an exemplary user interface, consistent with some embodiments of the present disclosure.

In some embodiments, first terminal 420*a* (and/or second terminal 430*a* as described below) may determine the next query to be displayed (or a first condition category) based on the received response. By way of example, as illustrated in FIG. 7C, first terminal 420*a* may display a third query "Q3. Product Condition: How is the product condition compared to the following pictures?", and the inspector may click the button "More Damaged than the products shown above," which may be received by first terminal 420*a*. In some embodiments, first terminal 420*a* may determine the next query based on a received response to a previous query according to a decision tree.

In some embodiments, first terminal 420*a* may include one or more sensors configured to obtain more information relating to the returned item. For example, first terminal 420*a* may include an image sensor configured to capture one or more images of the returned item. First terminal 420*a* may also include the image(s) as part of the information relating to the returned item for further processing (e.g., to determine a second condition category as described elsewhere in this disclosure).

Figure 7D:
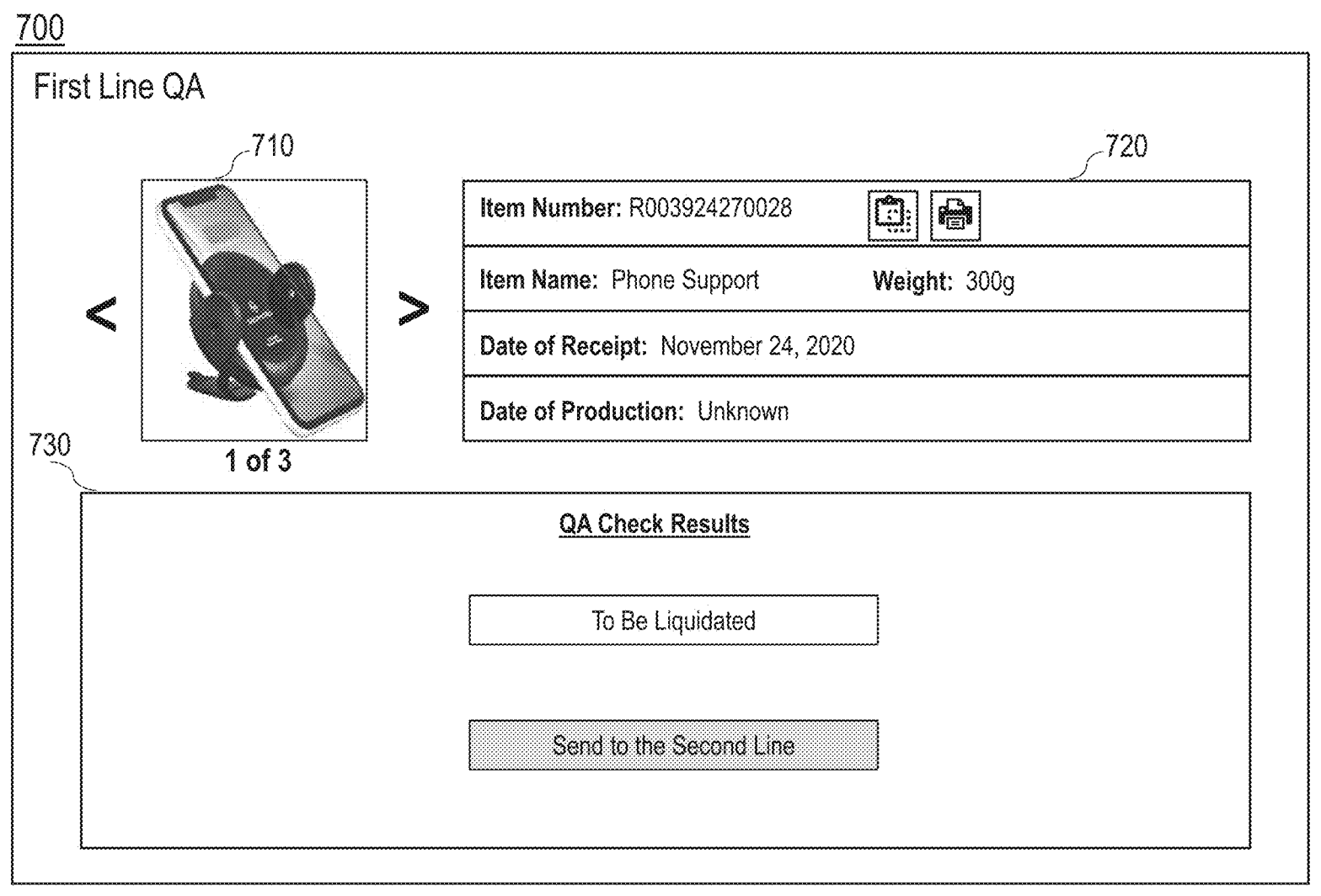

At step 610, server 410 and/or first terminal 420*a* may determine a first condition category of the returned item based on one or more responses to one or more queries. For example, as illustrated in FIG. 7D, first terminal 420*a* may determine that the first condition category of the returned item is a liquidation condition (i.e., the item should be liquidated). Alternatively, first terminal 420*a* may determine a condition of the returned item and request a confirmation from the inspector associated with first terminal 420*a*. For example, first terminal 420*a* may display an icon or text box representing the condition of "To Be Liquidated" in user interface 700. The inspector may confirm the condition determined (or recommended) by first terminal 420*a*. By way of example, the inspector may click the icon or text box to confirm, which may be received by first terminal 420*a*. On the other hand, the inspector may disagree with the determined (or recommended) condition and may request first terminal 420a to reconsider via the user interface. First terminal 420a may provide one or more additional questions and receive one or more responses from the inspector (as described elsewhere in this disclosure). First terminal 420a may also determine a (new) first condition category of the returned item based on the received response(s) and ask the inspector for confirmation. The inspector may confirm the newly determined first condition category via the user interface as described above.

In some embodiments, the first condition category determined by first terminal 420a may include at least one of a new condition, a damaged-box condition, a repacking condition, a used condition, a liquidation condition, a salvage condition, a scrap condition, a repair condition, a condition for a vendor exchange, a condition for a vendor return, an undecided condition, or the like, or a combination thereof.

In some embodiments, server 410 and/or first terminal 420a may determine a first condition category based on a rule-based model (e.g., a decision tree) and/or a machine learning model (e.g., a trained neural network). By way of example, server 410 and/or first terminal 420a may determine a first condition category using an exemplary neural network 900 illustrated in FIG. 9. Neural network 900 may include an input layer, one or more hidden layers, and an output layer. Each of the layers may include one or more nodes. In some embodiments, the output layer may include one node for outputting a result (e.g., a first condition category). Alternatively, the output layer may include a plurality of nodes, and each of the nodes may output data (e.g., a plurality of candidate first condition categories and corresponding probabilities). The input layer may be configured to receive input (e.g., the information relating to the returned item and/or one or more responses to one or more queries described herein). In some embodiments, every node in one layer is connected to every other node in the next layer. A node may take the weighted sum of its inputs and pass the weighted sum through a non-linear activation function, the results of which may be output as the input of another node in the next layer. The data may flow from left to right, and the final output may be calculated at the output layer based on the calculation of all the nodes. Neural network 900 may output a first condition category (and/or a plurality of candidate first condition categories).

Referring to FIG. 6, in some embodiments, server 410 and/or first terminal 420a may end process 600 at step 610 if the first condition category is one of the decided conditions (e.g., a new condition, a damaged-box condition, a repacking condition, a used condition, a liquidation condition, a salvage condition, a scrap condition, a condition for a vendor exchange, a condition for a vendor return). Optionally, server 410 and/or first terminal 420a may also update a status of a return associated with the returned item. For example, server 410 may determine that the returned item has a new condition, and may issue (or cause another component of system 300 to issue) a refund. Alternatively or additionally, server 410 may list (or cause another component of system 300 to list) the returned item on a web page or an application page for resale based on the determined first condition category. For example, server 410 may determine that the returned item is in a new condition. Server 410 may add the returned item into the existing inventory and list it on the web page as a new item. As another example, server 410 may determine that the returned item is in a used condition (e.g., a like-new condition). Server 410 may also determine a resale value of the returned item based on the determined first condition category, the information relating to the returned item, information gathered during the inspection associated with first terminal 420a, and/or the retailer price of a new product of a same kind as the returned item. Server 410 may also list (or cause another component of system 300 to list) the returned item on a web page or an application page for resale with the determined resale value. As another example, server 410 may determine that the returned item is in a liquidation condition and pack the returned item with one or more other items into a liquidation batch. Server 410 may also list (or cause another component of system 300 to list) the liquidation batch on a webpage or an application page for liquidation (e.g., a liquidation bidding).

In some embodiments, server 410 and/or first terminal 420a may determine that the returned item needs further inspection. For example, server 410 may determine that the first condition category is an undecided condition. Server 410 may also, at step 612, select a second terminal among a second group of terminals (e.g., second terminal 430a), based on the determined first condition category of the returned item. The second group of terminals may be different from the first group of terminals. For example, server 410 may select second terminal 430a, which may be designated for inspecting electronics. Alternatively or additionally, server 410 may select a particular second terminal based on the first condition category and/or the information relating to the returned item. For example, the information relating to the returned item may include information relating to the package of the item, which may be determined based on one or more images of the package captured by a camera when the package was received. Server 410 may determine that the package is unopened based on the information relating to the package and select a particular second terminal based on the condition of the package (and/or the category of the item as described above).

At step 614, server 410 and/or first terminal 420a transmitting the information relating to the returned item to the second terminal. The information relating to the returned item may include the information relating to the returned item obtained during the inspection associated with first terminal 420a. For example, as described above, first terminal 420a may include an image sensor configured to capture one or more images of the returned item. First terminal 420a may transmit the captured image(s) to second terminal 430a (and/or server 410).

In some embodiments, the returned item may be routed to second terminal 430a or personnel associated with second terminal 430a by, for example, an automatic carrier. By way of example, the location of the personnel (and/or second terminal 430a) may be obtained and sent to an automatic carrier (e.g., an unmanned vehicle), which may carry the returned item and deliver the returned item to the location of the personnel (and/or second terminal 430a).

Figure 8B:
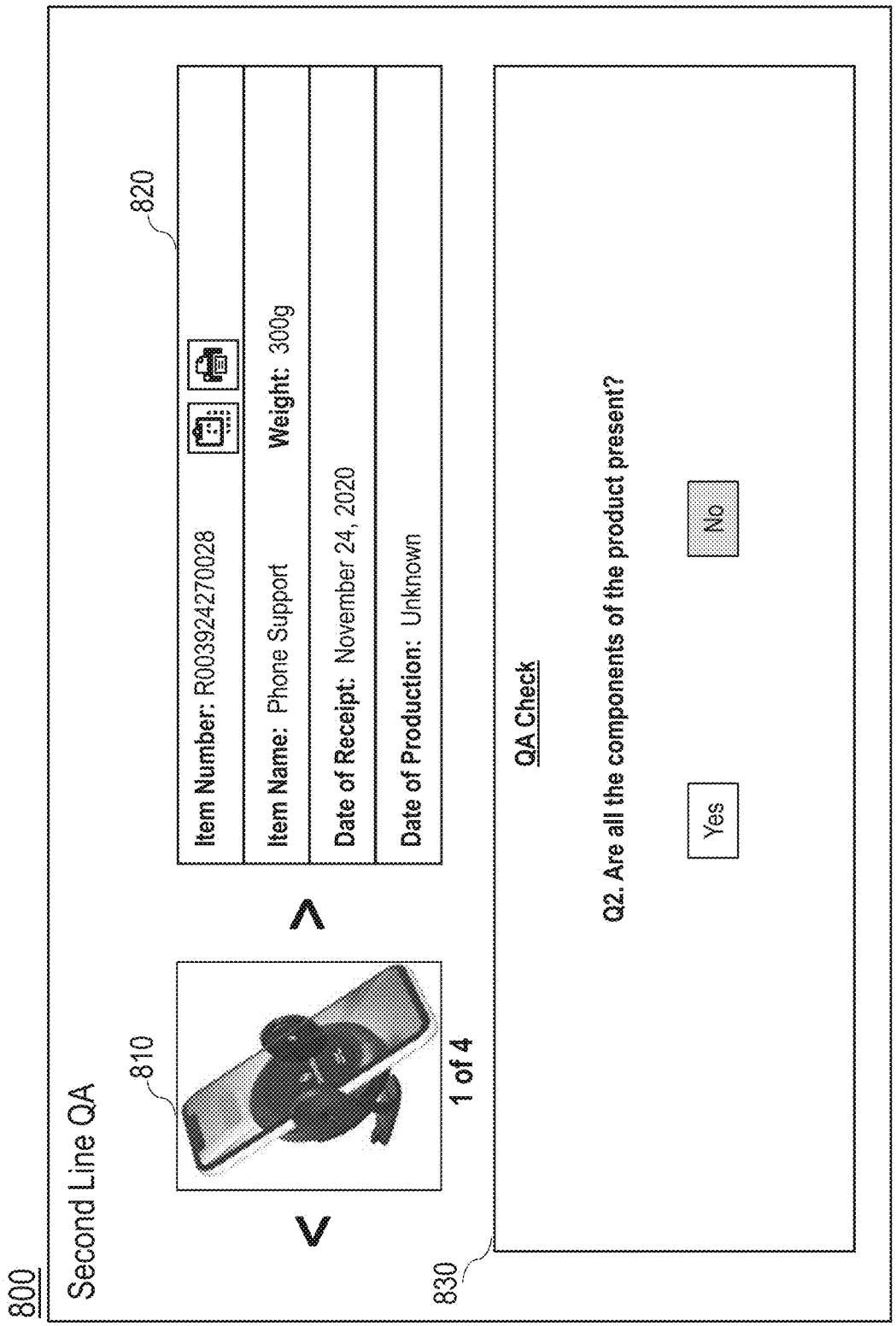
FIG. 8B illustrates a pictographic representation of an exemplary user interface, consistent with some embodiments of the present disclosure.
Figure 8C:
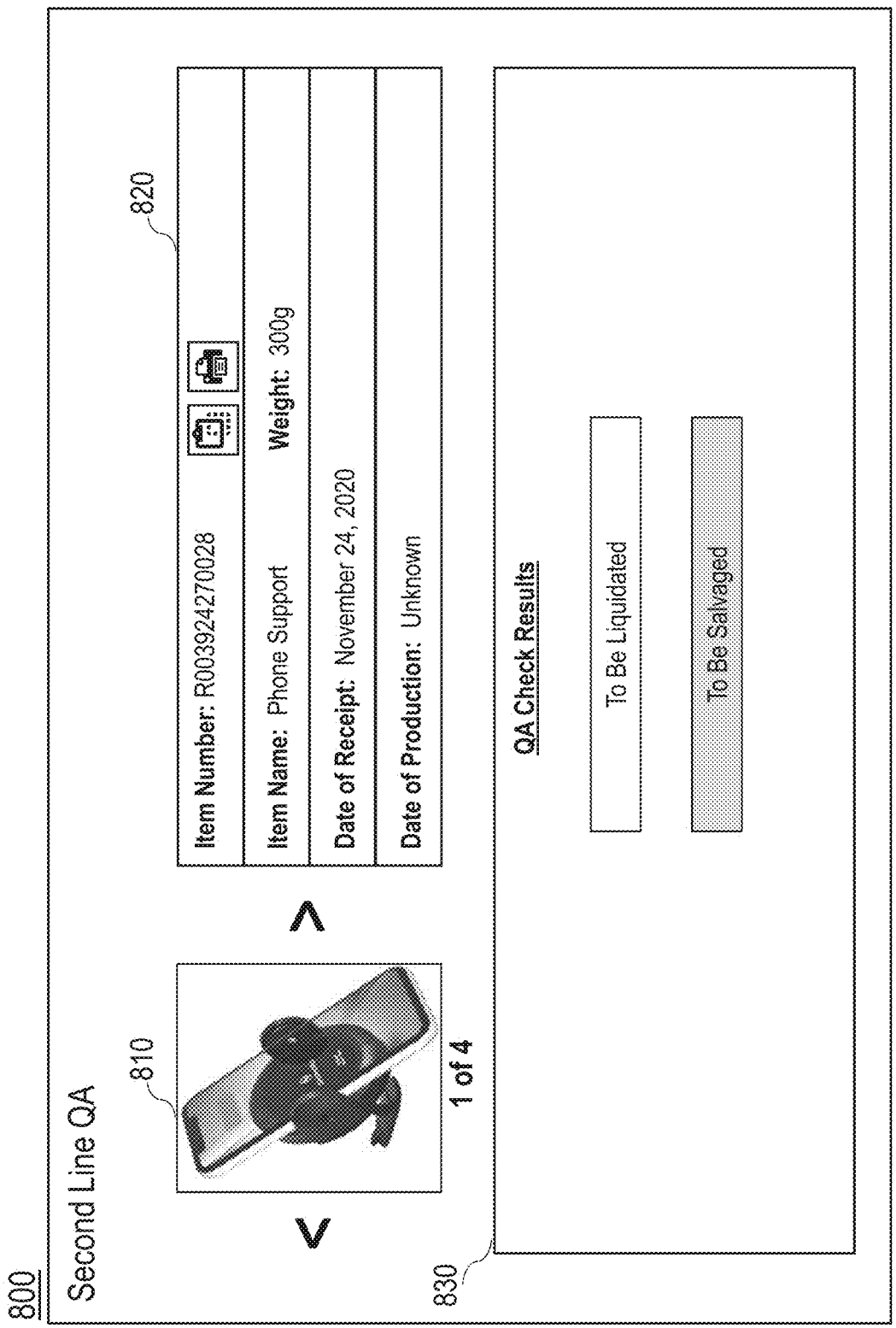
FIG. 8C illustrates a pictographic representation of an exemplary user interface, consistent with some embodiments of the present disclosure.
Figure 9:
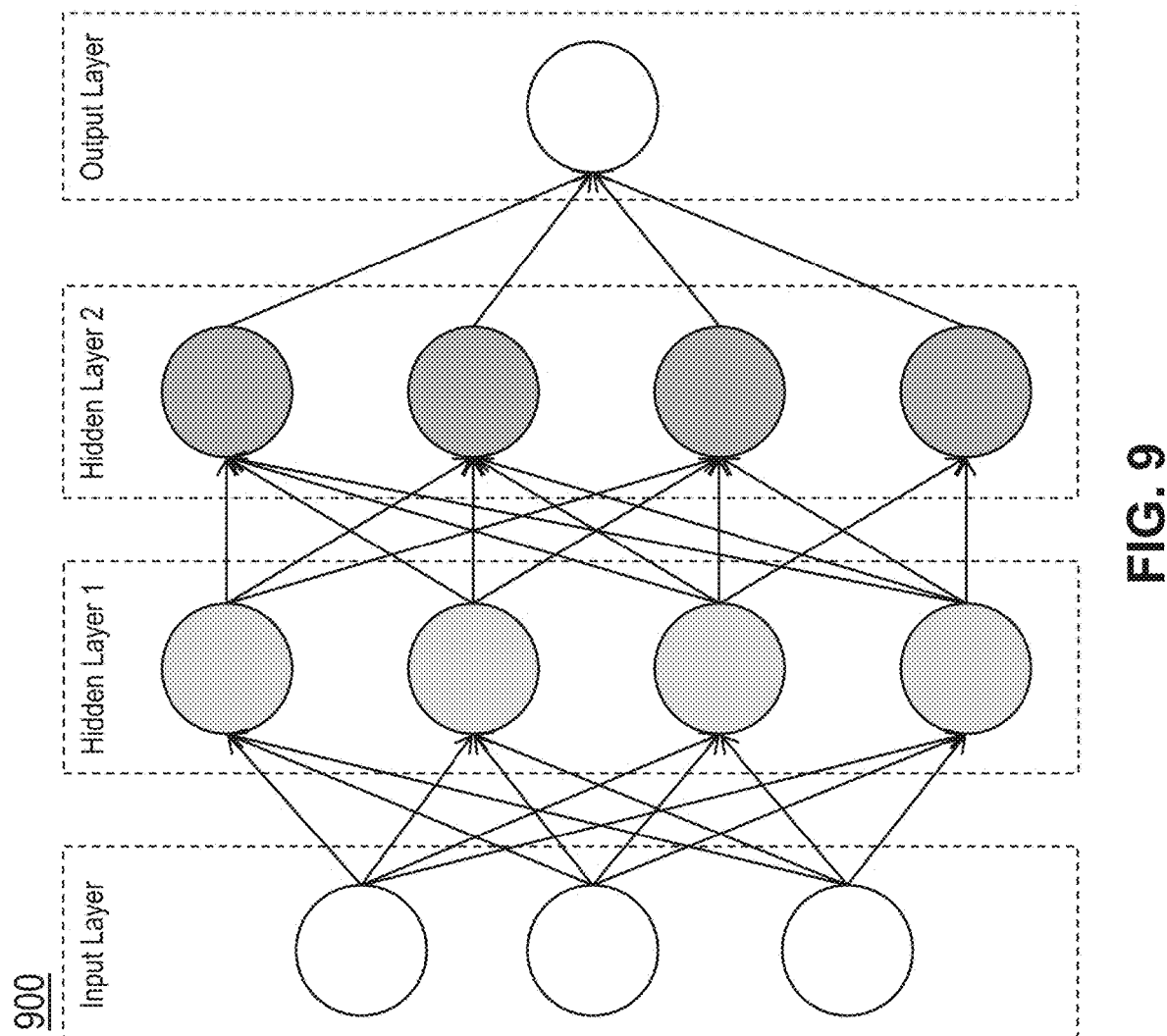
FIG. 9 is a diagram illustrating an exemplary neural network for determining a condition of a returned item, consistent with some embodiments of the present disclosure.

At step 616, server 410 and/or second terminal 430a may cause a second display associated with the second terminal to display in a second user interface at least a portion of the information relating to the returned item. For example, FIGS. 8A, 8B, and 8C illustrate an exemplary user interface 800 for displaying at least a portion of the information relating to the returned item. As illustrated in FIG. 8A (and FIGS. 8B, 8C, and 8D), user interface 800 may include a first area 810 configured to display one or more images of the returned item (and/or an item that is the same type of the returned item), a second area 820 configured to display the information of the item (e.g., item name, item number, etc.), and a third area 830 configured to display one or more queries relating to the condition of the item. In some embodiments, the one or more second queries may be different from the one or more first queries associated with first terminal 420a. For example, as illustrated in FIG. 8B, user interface 800 may display a query "Q2. Are all the components of the product present?" for an opened item, which may not be supplied by first terminal 420a. As described elsewhere in this disclosure, exemplary queries may include one or more of a question, an instruction for inspection, a manual, or the like, or a combination thereof. A query may include a text, an image, a video, or the like, or a combination thereof.

In some embodiments, server 410 may transmit one or more queries to second terminal 430a. Alternatively or additionally, second terminal 430a may obtain one or more queries from a local storage device or a remote storage device (e.g., database 450).

In some embodiments, server 410 (and/or second terminal 430a) may receive, via the second user interface, a second response to the one or more second queries. For example, as illustrated in FIG. 8A, user interface 800 may display a query "Q1. Is this Phone Support?". An inspector associated with second terminal 430a may click the "Yes" button through an input device (e.g., input device 505). Second terminal 430a may receive the response and determine the next query to be displayed in user interface 800. For example, as illustrated in FIG. 8B, second terminal 430a may display the second query "Q2. Are all the components of the product present?" in response to the received answer to the second query. Second terminal 430a may also receive a response to the Q2 query via user interface 800 (e.g., a click of the button "Yes").

In some embodiments, second terminal 430a may include one or more sensors configured to obtain more information relating to the returned item. For example, second terminal 430a may include an image sensor configured to capture one or more images of the returned item. Second terminal 430a may also include the image(s) as part of the information relating to the returned item for further processing (e.g., to a third terminal 440a associated with a repair center as described elsewhere in this disclosure).

In some embodiments, server 410 and/or second terminal 430a may determine a second condition category of the returned item based on one or more responses to one or more queries. For example, as illustrated in FIG. 8C, second terminal 430a may determine that the second condition category of the returned item is a salvage condition (i.e., the item should be salvaged or discarded with paying someone to remove the item from the premise) and display an option of "To Be Salvaged" in user interface 800. The inspector may click the option, which may be received by second terminal 430a. The second condition category may include at least one of a new condition, a damaged-box condition, a repacking condition, a used condition, a liquidation condition, a salvage condition, a scrap condition, a repair condition, a condition for a vendor exchange, a condition for a vendor return, or the like, or a combination thereof.

In some embodiments, server 410 and/or second terminal 430a may determine a second condition category based on a rule-based model (e.g., a decision tree) and/or a machine learning model (e.g., a trained neural network). By way of example, server 410 and/or second terminal 430a may determine a second condition category using an exemplary neural network 900 illustrated in FIG. 9 and described elsewhere in this disclosure. Neural network 900 may output a second condition category (and/or a plurality of candidate second condition categories).

In some embodiments, server 410 and/or second terminal 430a may also update a status of a return associated with the returned item. For example, server 410 may determine that the returned item has a salvage condition (which may be worthless), and may reject (or cause another component of system 300 to reject) the return associated with the returned item. Alternatively or additionally, server 410 may list (or cause another component of system 300 to list) the returned item on a web page or an application page for resale based on the determined second condition category. For example, server 410 may determine that the returned item is in a new condition. Server 410 may add the returned item into the existing inventory and list it on the web page as a new item. As another example, server 410 may determine that the returned item is in a used condition (e.g., a like-new condition). Server 410 may also determine a resale value of the returned item based on the determined second condition category, the information relating to the returned item, information gathered during the inspection associated with first terminal 420a and/or second terminal 430a, the retailer price of a new product of a same kind as the returned item, or the like, or a combination thereof. Server 410 may also list (or cause another component of system 300 to list) the returned item on a web page or an application page for resale with the determined resale value. As another example, server 410 may determine that the returned item is in a liquidation condition and pack the returned item with one or more other items into a liquidation batch. Server 410 may also list (or cause another component of system 300 to list) the liquidation batch on a web page or an application page for liquidation (e.g., a liquidation bidding).

In some embodiments, for a particular determined second condition category, server 410 and/or second terminal 430a may determine that the returned item needs a further inspection or a repair. For example, the second condition category of the returned item may include a repair condition. Server 410 and/or second terminal 430a may transmit the information relating to the returned item (which may include information gathered during the inspection associated with first terminal 420a and/or second terminal 430a as described elsewhere in this disclosure) to a third terminal, which may be associated with a repair center. In some embodiments, the third terminal may be different from first group of terminals 420 and second group of terminals 430. For example, server 410 may select a third terminal 440a among third group of terminals 440 and transmit the information relating to the returned item to third terminal 440a. In some embodiments, the returned item may be routed to third terminal 440a or personnel associated with third terminal 440a by, for example, an automatic carrier. By way of example, the location of the personnel (and/or third terminal 440a) may be obtained and sent to an automatic carrier (e.g., an unmanned vehicle), which may carry the returned item and deliver the returned item to the location of the personnel (and/or third terminal 440a).

The returned item may be inspected and/or repaired at the site associated with third terminal 440a. In some embodiments, third terminal 440a (and/or server 410) may cause a display to display a user interface including at least a portion of the information relating to the returned item (similar to user interface 700 and/or user interface 800 as described elsewhere in this disclosure), which may include one or more queries relating to a condition of the returned item (before and/or after a repair). Third terminal 440a (and/or server 410) may also determine a third condition category before and/or after a repair, based on one or more responses to one or more queries and/or the information relating to the returned item, similar to the steps for determining a first condition category and/or second condition category as described elsewhere in this disclosure.

In some embodiments, server 410 and/or third terminal 440a may also update a status of a return associated with the returned item after an inspection and/or a repair. For example, server 410 may determine that the returned item is in a salvage condition even after a repair and may reject (or cause another component of system 300 to reject) the return associated with the returned item. Alternatively or additionally, server 410 may list (or cause another component of system 300 to list) the returned item after the repair (or an inspection if no repair is needed) on a web page or an application page for resale based on the determined third condition category. For example, server 410 may determine that the returned item is in a used condition (e.g., a refurbished condition). Server 410 may also determine a resale value of the returned item based on the determined third condition category, the information relating to the returned item, information gathered during the inspection associated with first terminal 420a, second terminal 430a, and/or third terminal 440a, and/or the retailer price of a new product of a same kind as the returned item. Server 410 may also list (or cause another component of system 300 to list) the returned item on a web page or an application page for resale with the determined resale value. As another example, server 410 may determine that the returned item is in a liquidation condition and pack the returned item with one or more other items into a liquidation batch. Server 410 may also list (or cause another component of system 300 to list) the liquidation batch on a webpage or an application page for liquidation (e.g., a liquidation bidding).

While the present disclosure has shown and described methods and systems for storing and accessing data for return events, the embodiments disclosed herein are not limited to return events and may be used for storing data relating to other types of events. For example, in addition to or alternative to storing data relating to return events, the embodiments may also be used for storing data relating to order events, exchange events, transaction events, or the like, or a combination thereof.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for processing a returned item, the system comprising:
a memory storing instructions; and
at least one processor configured to execute the instructions to perform a process comprising:
receiving information relating to a returned item;
causing a first terminal to generate and display an image representing the returned item and one or more first queries relating to a condition of the returned item;
receiving, via the first terminal, a first response to the one or more first queries;
determining, based on the first response, a first condition category of the returned item, wherein determining the first condition category comprises:
obtaining a trained machine-learning model for determining a condition category, the trained machine-learning model comprising an input layer and an output layer;
inputting the first response into the input layer of the trained machine-learning model; and
obtaining output from the output layer of the trained machine-learning model, the output comprising the first condition category determined by the trained machine-learning model based on the first response;
determining whether the first condition category is a further-inspection condition category;
transmitting, in response to a determination that the first condition category is a further-inspection condition category, the information relating to the returned item to a second terminal; and
causing the second terminal to generate and display one or more second queries, the one or more second queries being different from the one or more first queries.

2. The system of claim 1, wherein the first condition category comprises at least one of a new condition, a damaged-box condition, a repacking condition, a used condition, a liquidation condition, a salvage condition, a scrap condition, an undecided condition.

3. The system of claim 1, wherein receiving information relating to the returned item comprises:
causing a scanner to scan an identifier appearing on a package of the returned item or the returned item; and obtain, from a database, the information relating to a returned item stored based on the identifier.

4. The system of claim 3, wherein the process further comprises receiving, from the database, the image representing the returned item based on the identifier.

5. The system of claim 1, wherein the process further comprises:
determining whether the first condition category is a predetermined resale condition category; and
in response to a determination that the first condition category is the first predetermined resale condition category, listing the returned item onto a web page or an application page for resale.

6. The system of claim 1, wherein the one or more first queries comprise at least one query relating to a condition of a package of the returned item.

7. The system of claim 6, wherein the at least one query relating to the condition of the package of the returned item comprises information relating to two or more exemplary package conditions.

8. The system of claim 7, wherein the information relating to two or more exemplary package conditions comprises an exemplary image representing at least one of the two or more exemplary package conditions.

9. The system of claim 7, wherein receiving the first response comprises receiving a selection of the two or more exemplary package conditions.

10. The system of claim 1, wherein the process further comprises:
receiving, from the second terminal, a second response to the one or more second queries; and
determining, based on the second response, a second condition category for the returned item.

11. The system of claim 10, wherein the second condition category comprises at least one of a new condition, a damaged-box condition, a repacking condition, a used condition, a liquidation condition, a salvage condition, a scrap condition, or a repair condition.

12. The system of claim 10, wherein:
the second condition category of the returned item comprises a repair condition; and
the process further comprises transmitting the information relating to the returned item to a third terminal associated with a repair center, the third terminal being different from the first terminal and the second terminal.

13. The system of claim 1, wherein the process further comprises:
transmitting, to the second terminal, information relating to the one or more first queries and the first response.

14. The system of claim 1, wherein the process further comprises:
determining, based on the determined second condition, a resale value of the returned item.

15. The system of claim 14, wherein determining the resale value of the returned item comprises:
obtaining a retailer price of a new product of a same kind as the returned item; and
determining the resale value of the returned item based on the retailer price and the first condition category.

16. The system of claim 1, wherein the process further comprises:
listing the returned item onto a web page or an application page for resale.

17. The system of claim 1, wherein the trained machine-learning model further comprises a hidden layer.

18. The system of claim 1, wherein the process further comprises:
listing the returned item onto a webpage or an application page for liquidation bidding.

19. A computer-implemented method for processing a returned item, comprising:
receiving information relating to a returned item;
causing a first terminal to generate and display an image representing the returned item and one or more first queries relating to a condition of the returned item;
receiving, via the first terminal, a first response to the one or more first queries;
determining, based on the first response, a first condition category of the returned item, wherein determining the first condition category comprises:
obtaining a trained machine-learning model for determining a condition category, the trained machine-learning model comprising an input layer and an output layer;
inputting the first response into the input layer of the trained machine-learning model; and
obtaining output from the output layer of the trained machine-learning model, the output comprising the first condition category determined by the trained machine-learning model based on the first response;
determining whether the first condition category is a further-inspection condition category;
transmitting, in response to a determination that the first condition category is a further-inspection condition category, the information relating to the returned item to a second terminal; and
causing the second terminal to generate and display one or more second queries, the one or more second queries being different from the one or more first queries.

20. A non-transitory computer-readable medium comprising instructions, wherein the instructions, when executed by at least one processor, are configured to cause a system to perform a process comprising:
receiving information relating to a returned item;
causing the first terminal to generate and display an image representing the returned item and one or more first queries relating to a condition of the returned item;
receiving, via the first terminal, a response to the one or more first queries based on user input;
determining a return condition by;
obtaining a neural network for determining a return condition, the neural network comprising an input layer and an output layer;
inputting the response and the information relating to the returned item into the input layer of the neural network;
obtaining output from the output layer of the neural network, the output comprising the return condition determined by the neural network based on the response and the information relating to the returned item;
determining whether the determined return condition is a further-inspection condition;
in response to a determination that the determined condition is a further-inspection condition:
transmitting the information relating to the returned item to the second terminal; and
causing the second terminal to generate and display one or more second queries, the one or more second queries being different from the one or more first queries.

* * * * *